United States Patent
Oh et al.

(10) Patent No.: US 12,372,200 B2
(45) Date of Patent: Jul. 29, 2025

(54) MOUNTING BRACKET FOR ELECTRICAL BOXES

(71) Applicant: ERICO International Corporation, Solon, OH (US)

(72) Inventors: Michael Hung-Sun Oh, Twinsburg, OH (US); James Anthony Bukowski, Akron, OH (US); Kevin Jacobs, Cuyahoga Falls, OH (US)

(73) Assignee: ERICO International Corporation, Solon, OH (US)

( * ) Notice: Subject to any disclaimer, the term of this patent is extended or adjusted under 35 U.S.C. 154(b) by 0 days.

(21) Appl. No.: 18/631,506

(22) Filed: Apr. 10, 2024

(65) Prior Publication Data

US 2024/0271750 A1     Aug. 15, 2024

Related U.S. Application Data

(63) Continuation of application No. 18/047,507, filed on Oct. 18, 2022, now Pat. No. 11,959,588, which is a
(Continued)

(51) Int. Cl.
*H02G 3/00* (2006.01)
*F16M 13/02* (2006.01)
(Continued)

(52) U.S. Cl.
CPC ........ *F16M 13/022* (2013.01); *H02G 3/0456* (2013.01); *H02G 3/08* (2013.01)

(58) Field of Classification Search
None
See application file for complete search history.

(56) References Cited

U.S. PATENT DOCUMENTS

| 1,211,182 A |   | 1/1917 | Kruse |
| 1,583,474 A | * | 5/1926 | Kruse ................ H02G 3/126 |
|             |   |        | 248/906 |

(Continued)

FOREIGN PATENT DOCUMENTS

| DE | 10246246 A1 | 4/2004 |
| DE | 102014101337 B4 | 6/2015 |

(Continued)

OTHER PUBLICATIONS

ASD Commercial Residential Lighting Product Catalog 2024, 74 pages.

(Continued)

*Primary Examiner* — Steven M Marsh
(74) *Attorney, Agent, or Firm* — Quarles & Brady LLP

(57) ABSTRACT

A mounting bracket for an electrical box can be configured for use with a support that has a first and a second rail. The mounting bracket can include a first attachment device that is secured to mounting body and a second attachment device that is secured to the mounting body opposite the first attachment device. To secure the mounting bracket to the support, the first attachment device can be configured to engage one of the first rail or the second rail and the second attachment device can be configured to engage the other of the first rail or the second rail. Each of the first and second attachment devices can include a first arm configured to extend on a first side of the corresponding first or second rail, and a second arm configured to extend on a second side of the corresponding rail, opposite the first arm.

20 Claims, 16 Drawing Sheets

Related U.S. Application Data continuation of application No. 16/890,431, filed on Jun. 2, 2020, now Pat. No. 11,473,721.

(60) Provisional application No. 62/890,750, filed on Aug. 23, 2019, provisional application No. 62/856,560, filed on Jun. 3, 2019.

(51) Int. Cl.
  *H02G 3/04* (2006.01)
  *H02G 3/08* (2006.01)

(56) References Cited

U.S. PATENT DOCUMENTS

| | | | |
|---|---|---|---|
| 1,725,293 A * | 8/1929 | Morgenstern | H02G 3/126 248/300 |
| 1,982,957 A | 12/1934 | Knell | |
| 1,999,194 A * | 4/1935 | Hubbell, Jr. | H02G 3/123 220/3.6 |
| 2,023,083 A * | 12/1935 | Knell | H02G 3/126 220/3.9 |
| 2,711,876 A | 6/1955 | Goebel | |
| 2,788,187 A | 4/1957 | Mont et al. | |
| 2,915,266 A * | 12/1959 | Antonucci | H02G 3/121 411/523 |
| 3,371,900 A | 3/1968 | Jacobs | |
| 3,816,880 A | 6/1974 | Jacobs | |
| 4,088,293 A | 5/1978 | Delmore | |
| 4,098,423 A | 7/1978 | Marrero | |
| 4,328,903 A | 5/1982 | Baars | |
| 4,483,453 A | 11/1984 | Smolik | |
| 4,580,689 A | 4/1986 | Slater | |
| 4,666,055 A | 5/1987 | Lewis | |
| 4,964,525 A | 10/1990 | Coffey et al. | |
| 5,005,792 A | 4/1991 | Rinderer | |
| 5,263,676 A | 11/1993 | Medlin, Jr. et al. | |
| 5,281,187 A | 1/1994 | Whitney, Jr. | |
| 5,330,137 A | 7/1994 | Oliva | |
| 5,434,359 A | 7/1995 | Schnell | |
| 5,646,371 A | 7/1997 | Fabian | |
| 5,703,327 A | 12/1997 | Jorgensen | |
| 5,927,667 A | 7/1999 | Swanson | |
| 5,931,425 A | 8/1999 | Oliva | |
| 5,954,304 A | 9/1999 | Jorgensen | |
| 6,098,939 A | 8/2000 | He | |
| 6,209,836 B1 | 4/2001 | Swanson | |
| 6,229,087 B1 | 5/2001 | Archer | |
| 6,286,265 B1 | 9/2001 | Rinderer | |
| 6,327,758 B1 | 12/2001 | Petrakis et al. | |
| 6,332,597 B1 | 12/2001 | Korcz et al. | |
| 6,341,466 B1 | 1/2002 | Kehoe et al. | |
| 6,345,800 B1 | 2/2002 | Herst et al. | |
| 6,666,419 B1 | 12/2003 | Vrame | |
| 6,799,982 B2 | 10/2004 | Kerr, Jr. | |
| 6,803,521 B2 | 10/2004 | Vrame | |
| 6,875,922 B1 | 4/2005 | Petak et al. | |
| 6,889,943 B2 | 5/2005 | Dinh et al. | |
| 7,036,782 B2 | 5/2006 | Cheatham et al. | |
| 7,053,300 B2 | 5/2006 | Denier et al. | |
| 7,118,254 B2 | 10/2006 | Czech | |
| 7,271,335 B2 | 9/2007 | Dinh | |
| 7,271,336 B2 | 9/2007 | Dinh | |
| 7,300,025 B2 | 11/2007 | Korcz | |
| 7,312,396 B1 | 12/2007 | Gorman | |
| D571,944 S | 6/2008 | Pickard et al. | |
| 7,510,159 B2 | 3/2009 | Rippel | |
| 7,521,631 B2 | 4/2009 | Dinh | |
| D596,330 S | 7/2009 | Pickard et al. | |
| 7,572,977 B2 | 8/2009 | Gorman | |
| 7,628,367 B2 | 12/2009 | Friederich et al. | |
| 7,673,841 B2 | 3/2010 | Wronski | |
| 7,735,795 B2 | 6/2010 | Wronski | |
| 7,798,458 B2 | 9/2010 | Borbolla et al. | |
| 7,802,765 B2 | 9/2010 | Thieman | |
| 7,810,775 B2 | 10/2010 | Dal Ponte et al. | |
| 7,874,539 B2 | 1/2011 | Wright et al. | |
| 7,874,708 B1 | 1/2011 | Jones et al. | |
| 7,956,285 B2 | 6/2011 | Tally et al. | |
| 7,967,480 B2 | 6/2011 | Pickard et al. | |
| 8,021,007 B2 | 9/2011 | Rapeanu et al. | |
| 8,042,776 B2 | 10/2011 | Johnson | |
| 8,177,176 B2 | 5/2012 | Nguyen et al. | |
| 8,240,630 B2 | 8/2012 | Wronski | |
| 8,403,289 B1 | 3/2013 | Rinderer | |
| 8,475,014 B2 | 7/2013 | Jones et al. | |
| 8,622,361 B2 | 1/2014 | Wronski | |
| 8,658,894 B1 | 2/2014 | Witherbee | |
| 8,669,471 B2 | 3/2014 | Temblador et al. | |
| 8,680,394 B2 | 3/2014 | Korcz et al. | |
| 8,783,896 B2 | 7/2014 | Tirrell et al. | |
| RE45,430 E | 3/2015 | Gorman | |
| 9,004,435 B2 | 4/2015 | Wronski | |
| 9,088,143 B2 | 7/2015 | Brey et al. | |
| 9,239,131 B1 | 1/2016 | Wronski et al. | |
| 9,335,033 B2 | 5/2016 | Gagne et al. | |
| 9,397,491 B2 | 7/2016 | Birli et al. | |
| 9,444,236 B2 | 9/2016 | Witherbee | |
| 9,447,917 B1 | 9/2016 | Wronski et al. | |
| 9,559,504 B2 | 1/2017 | Jones | |
| 9,564,744 B2 | 2/2017 | Jaffari et al. | |
| D785,853 S | 5/2017 | Debellis | |
| D785,854 S | 5/2017 | Debellis | |
| 9,653,899 B2 | 5/2017 | Salian et al. | |
| 9,664,347 B1 | 5/2017 | Wronski et al. | |
| 9,689,541 B2 | 6/2017 | Wronski | |
| 9,696,021 B2 | 7/2017 | Wronski | |
| 9,732,904 B1 | 8/2017 | Wronski | |
| 9,780,545 B2 | 10/2017 | Witherbee | |
| 9,825,446 B2 | 11/2017 | Korcz et al. | |
| 9,853,431 B2 | 12/2017 | Jones | |
| D821,849 S | 7/2018 | Nikayin et al. | |
| 10,077,866 B2 | 9/2018 | Witherbee | |
| 10,084,298 B2 | 9/2018 | Terwilleger | |
| D841,432 S | 2/2019 | Nikayin et al. | |
| 10,256,613 B2 | 4/2019 | Korcz et al. | |
| 10,480,708 B1 | 11/2019 | Zamora et al. | |
| 10,508,767 B2 | 12/2019 | Zamora et al. | |
| 10,561,873 B2 | 2/2020 | Beagen et al. | |
| D898,985 S | 10/2020 | Debellis | |
| D899,673 S | 10/2020 | Debellis | |
| 10,859,218 B2 | 12/2020 | Momin et al. | |
| 11,125,359 B2 | 9/2021 | Beagen et al. | |
| 11,231,154 B2 | 1/2022 | Kopitzke et al. | |
| 11,262,053 B2 | 3/2022 | Huang et al. | |
| 11,342,733 B2 | 5/2022 | Oh | |
| 11,460,172 B2 | 10/2022 | Ameloot et al. | |
| 11,828,397 B2 | 11/2023 | Beagen et al. | |
| 11,885,480 B1 | 1/2024 | Lacroix | |
| 2004/0061033 A1 | 4/2004 | Nicolides et al. | |
| 2005/0067546 A1 | 3/2005 | Dinh | |
| 2005/0176278 A1 | 8/2005 | Cheatham et al. | |
| 2006/0101741 A1 | 5/2006 | Rae | |
| 2007/0057130 A1 | 3/2007 | Nikayin et al. | |
| 2010/0006723 A1 | 1/2010 | Yan | |
| 2010/0078532 A1 | 4/2010 | Whipple et al. | |
| 2010/0108347 A1 | 5/2010 | Korcz et al. | |
| 2010/0176138 A1 | 7/2010 | Zacharevitz et al. | |
| 2010/0270446 A1 | 10/2010 | Phillips | |
| 2013/0099083 A1 | 4/2013 | Gagne et al. | |
| 2014/0054059 A1 | 2/2014 | Smith et al. | |
| 2016/0099555 A1 | 4/2016 | Nikayin et al. | |
| 2018/0261987 A1 | 9/2018 | Korcz et al. | |
| 2019/0086025 A1 | 3/2019 | Witherbee | |
| 2019/0137031 A1 | 5/2019 | Johnson et al. | |
| 2019/0376643 A1 | 12/2019 | Witherbee et al. | |
| 2022/0037868 A1 | 2/2022 | Taylor et al. | |
| 2024/0060578 A1 | 2/2024 | Beagen et al. | |
| 2024/0167276 A1 | 5/2024 | Beristany et al. | |

FOREIGN PATENT DOCUMENTS

| | | |
|---|---|---|
| EP | 0657060 B1 | 6/1998 |
| EP | 1426679 A2 | 6/2004 |

(56) References Cited

FOREIGN PATENT DOCUMENTS

| EP | 2543787 B1 | 8/2019 |
| GB | 2412425 A | 9/2005 |
| RU | 174872 U1 | 11/2017 |
| WO | 9416445 A1 | 7/1994 |
| WO | 2009015041 A2 | 1/2009 |
| WO | 2010008778 A2 | 1/2010 |
| WO | 2017152110 A1 | 9/2017 |

OTHER PUBLICATIONS

Orbit Industries, Inc., Recessed Light Adapter Plates, https://www.orbitelectric.com/recessed-light-adapter-plates.html, printed Jul. 24, 2024, 2 pages.
Orbit Industries, Inc., Flat Bracket Family, specification sheet, undated, 1 page.
Hubbell, Three Gang Multi-Configuration Flip Covers, specification sheet, undated, 1 page.
Hubbell, Wall Switch Sensors, specification sheet, undated, 1 page.
ABB Installation Products, Steel City Metallic Boxes and Covers catalog, Copyright 2018 ABB, 76 pages.
Orbit Industries, Inc. Universal Mounting Adapter with Back Support, specification sheet, undated, 1 page.
Orbit Industries, Inc. Simple Support Bracket & Universal Mounting Adapter, specification sheet, undated, 1 page.

\* cited by examiner

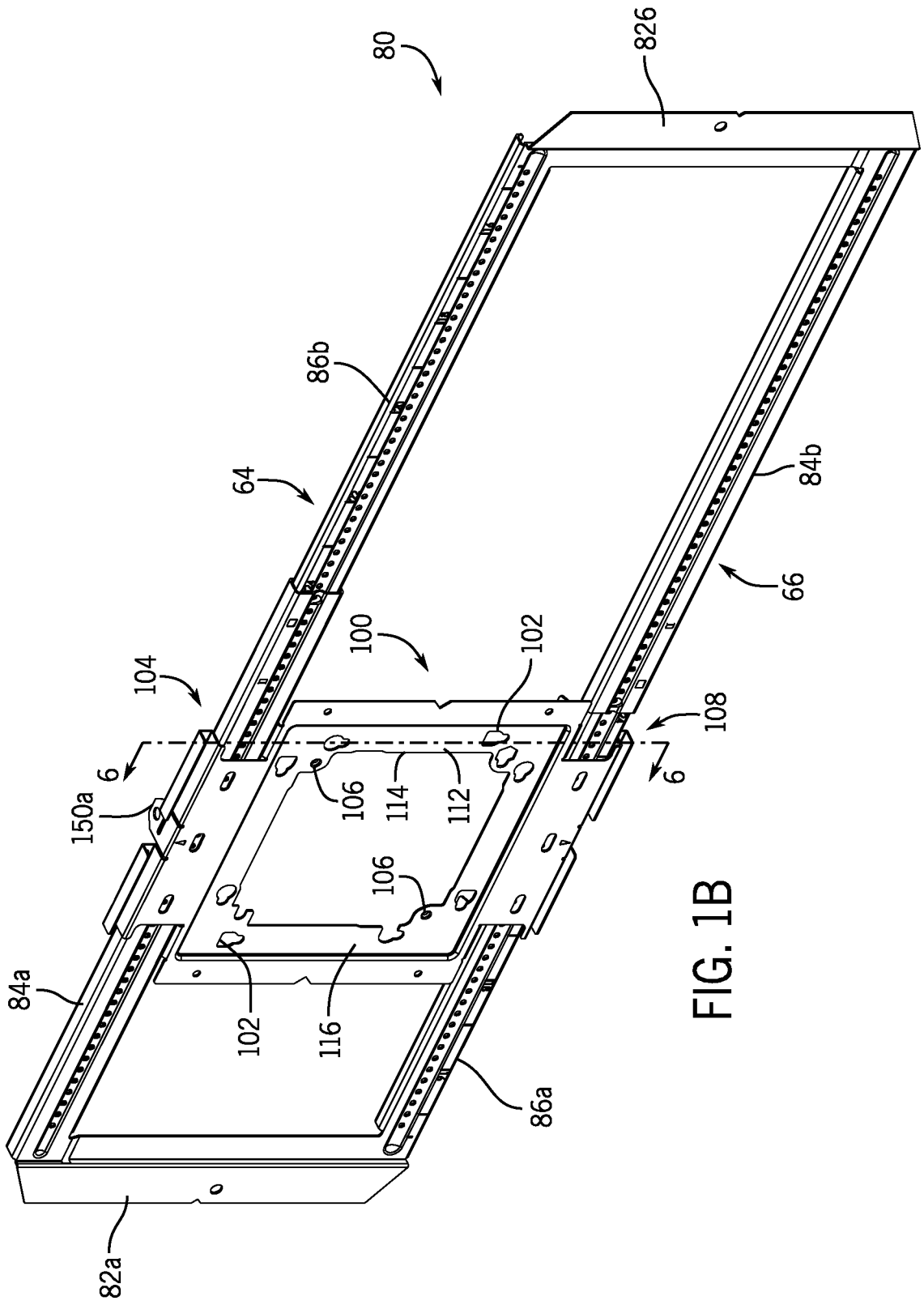

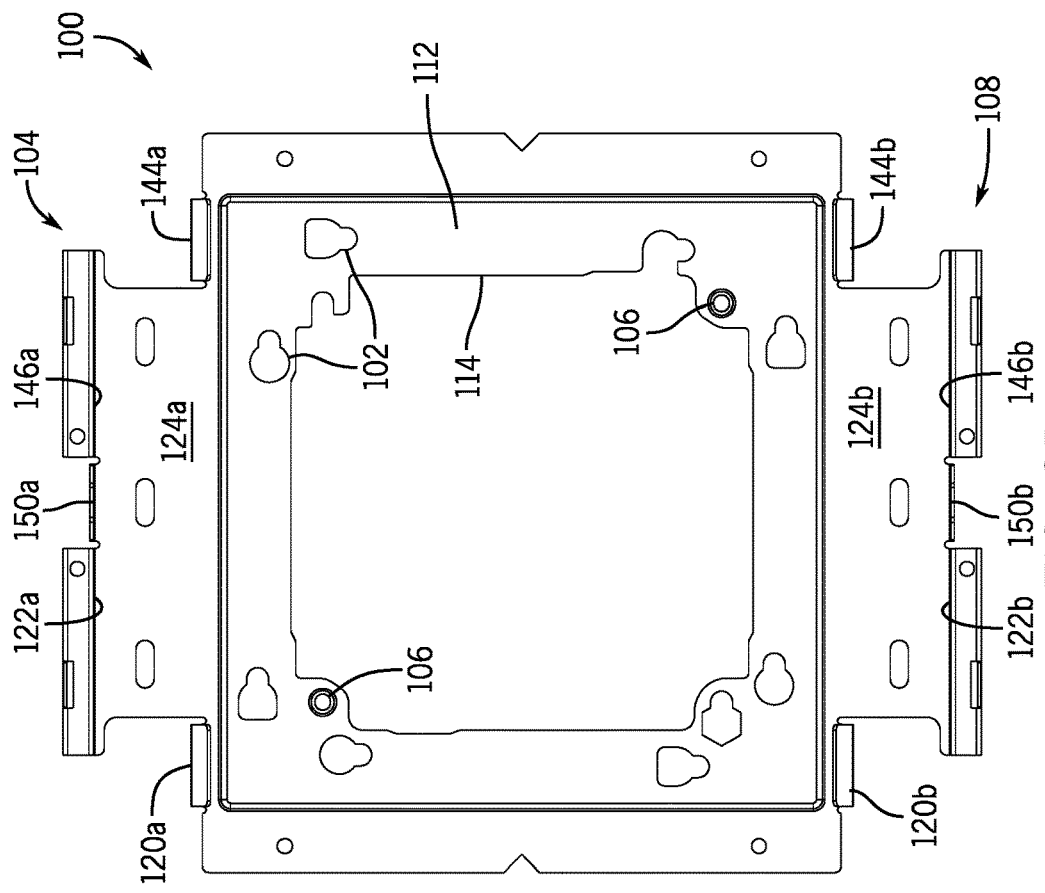
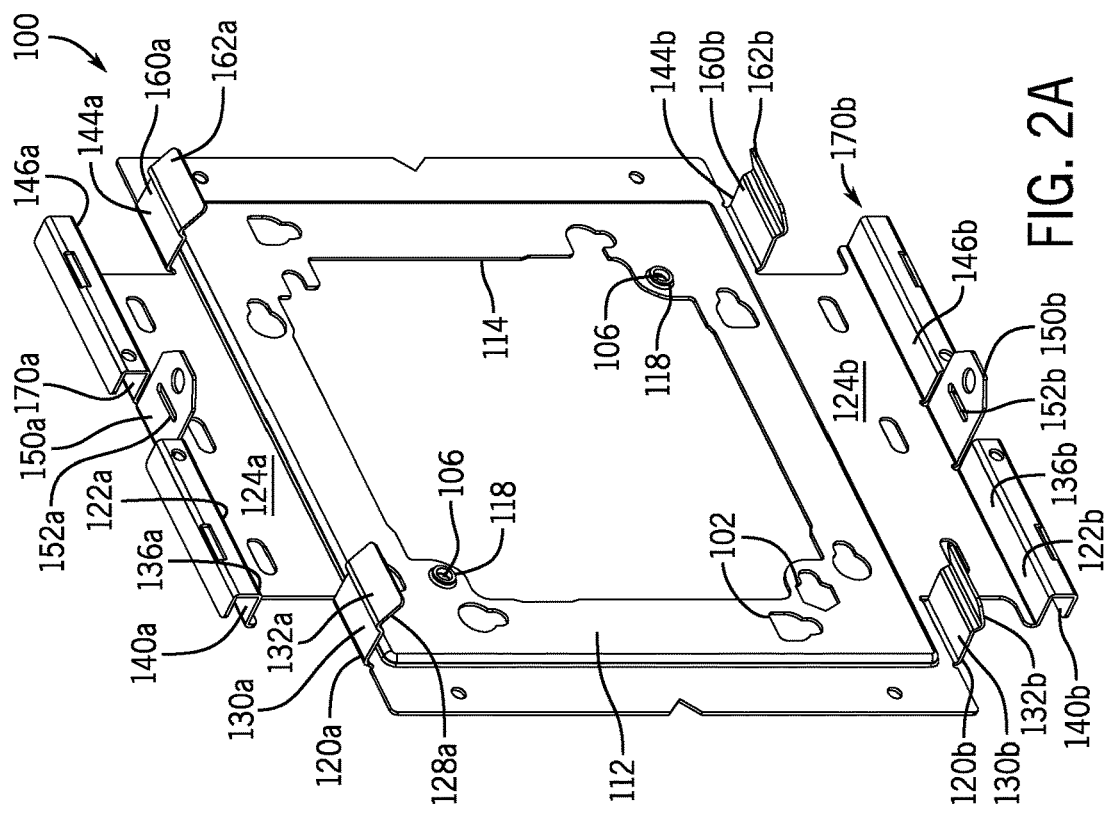

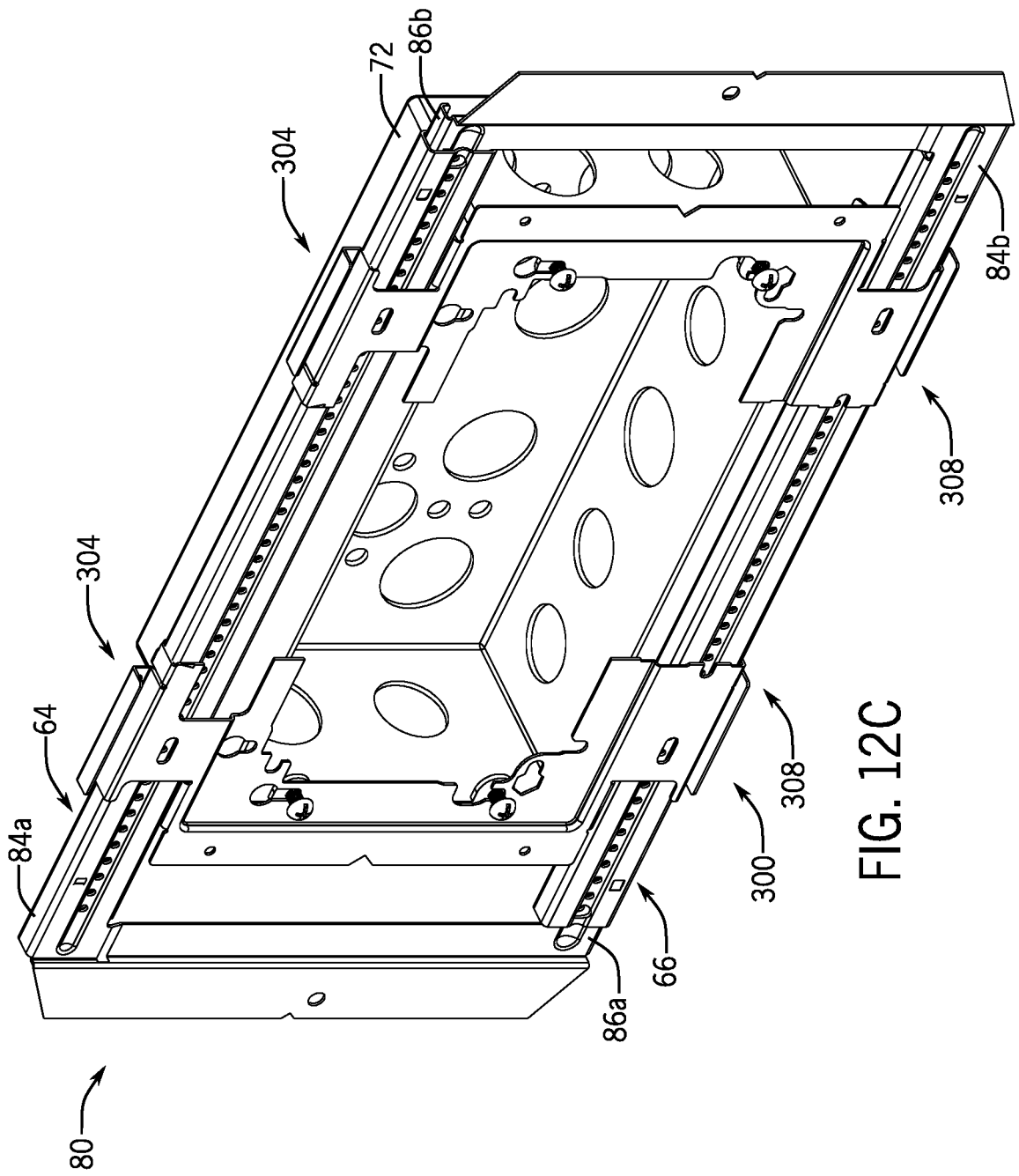

MOUNTING BRACKET FOR ELECTRICAL BOXES

RELATED APPLICATIONS

This application is a continuation of U.S. patent application Ser. No. 18/047,507, filed Oct. 18, 2022, which is a continuation of U.S. patent application Ser. No. 16/890,431, filed Jun. 2, 2020, which claims priority under 35 U.S.C. 119 from U.S. Provisional Application No. 62/856,560, filed Jun. 3, 2019 and from U.S. Provisional Application No. 62/890,750, filed Aug. 23, 2019, which are incorporated herein by reference in their entirety.

BACKGROUND

In many applications, it may be useful to support electrical boxes and other components. For example, according to some construction standards, electrical boxes may be required to be supported at particular heights above a floor or at particular distances from certain other structures or components.

SUMMARY

Some embodiments of the invention provide a mounting bracket for an electrical box, for use with a support having an upper rail and a lower rail that is spaced apart from the upper rail. The mounting bracket can include a mounting body configured to secure the electrical box to the mounting bracket between the upper and lower rails when the mounting bracket is secured to the support. The mounting body can include a mounting face to support the electrical box, a first attachment device connected to the mounting body, and a second attachment device connected to the mounting body opposite the first attachment device. The first attachment device can extend rearwardly away from the mounting face and can be configured to selectively engage either of the upper rail or the lower rail to secure the mounting bracket to the support. The second attachment device can extend rearwardly away from the mounting face and can be configured to selectively engage either of the other of the upper rail or the lower rail to secure the mounting bracket to the support. Each of the first and second attachment devices can include, respectively, a first arm configured to extend along and engage with a first side of the corresponding upper or lower rail and a second arm configured to extend along and engage with a second side of the corresponding upper or lower rail that is opposite the first side.

Some embodiments of the invention provide a mounting bracket for an electrical box, for use with a support having a first rail and a second rail that are spaced apart from each other, with a first side of each of the first and second rails facing towards the other of the first and second rails and with a second side of each of the first and second rails facing away from the other of the first and second rails. The mounting bracket can include a mounting body configured to secure the electrical box to the mounting bracket, a first attachment device connected to the mounting body and configured to engage the first and second sides of either of the first rail or the second rail to resiliently secure the mounting bracket to the support, and a second attachment device connected to the mounting body opposite the first attachment device and configured to engage the first and second sides of either of the other of the first rail or the second rail to resiliently secure the mounting bracket to the support.

Some embodiments of the invention provide a method of installing a mounting bracket onto a support to install an electrical box between first and second rails of the support. The method can include engaging a first attachment device of the mounting bracket with the first rail of the support, including engaging a first resilient arm with a first side of the first rail and a second arm with a second side of the first rail that is opposite the first side, and engaging a second attachment device of the mounting bracket with the second rail of the support, including engaging a third resilient arm with a first side of the second rail and a fourth arm with a second side of the second rail that is opposite the first side. The first and second attachment devices can secure the mounting bracket to the support without the use of separate fasteners.

Some embodiments of the invention provide a mounting bracket for an electrical box, for use with a support having a first rail and a second rail. The mounting bracket can include a mounting body configured to secure the electrical box to the mounting bracket, a first arm secured to the mounting body configured to engage one of the first rail or the second rail to secure the mounting bracket to the support, and a second arm secured to the mounting body, opposite the first arm, configured to engage the other of the first rail or the second rail to secure the mounting bracket to the support. The mounting body can have a mounting face and a set of mounting holes extending through the mounting body. At least one mounting hole of the set of mounting holes can have at least one of an extrusion that extends away from the mounting face or a surrounding portion that is thicker than adjacent portions of the mounting body.

BRIEF DESCRIPTION OF THE DRAWINGS

The accompanying drawings, which are incorporated in and form a part of this specification, illustrate embodiments of the invention and, together with the description, serve to explain the principles of embodiments of the invention:

FIG. 1B is a front perspective view of the mounting bracket and the support bracket of FIG. 1B with the support bracket and the mounting bracket in respective second positions;

FIG. 2A is a rear perspective view of the mounting bracket of FIG. 1A;

FIG. 2B is a rear elevation view of the mounting bracket of FIG. 1A;

FIG. 12C is a perspective view of the mounting bracket of FIG. 12A broken at the break features and coupled to an electrical box and a support;

DETAILED DESCRIPTION

Figure 1A:
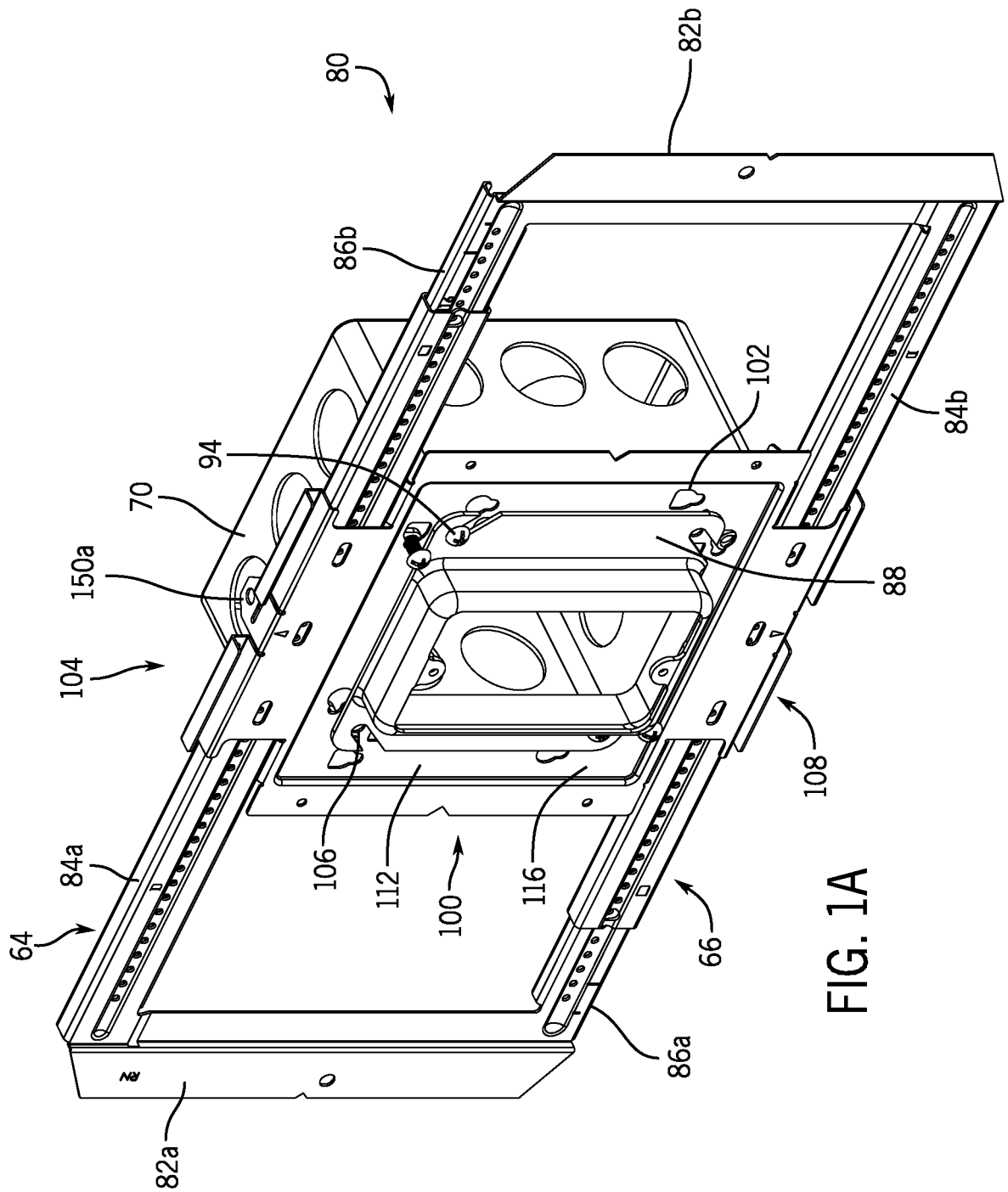
FIG. 1A is a front perspective view of a mounting bracket according to an embodiment of the invention, with a support and the mounting bracket in respective first positions, an electrical box, and a mud ring.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also as used herein, unless otherwise specified or limited, directional terms are presented only with regard to the particular embodiment and perspective described. For example, reference to features or directions as "horizontal," "vertical," "front," "rear," "left," "right," "upper," "lower," and so on are generally made with reference to a particular figure or example and are not necessarily indicative of an absolute orientation or direction. However, relative directional terms for a particular embodiment may generally apply to alternative orientations of that embodiment. For example, "front" and "rear" directions or features (or "right" and "left" directions or features, and so on) may be generally understood to indicate relatively opposite directions or features for a particular embodiment, regardless of the absolute orientation of the embodiment (or relative orientation relative to environmental structures). "Lateral" and derivatives thereof generally indicate directions that are generally perpendicular to a vertical direction for a relevant reference frame.

Also as used herein, ordinal numbers are used for convenience of presentation only and are generally presented in an order that corresponds to the order in which particular features are introduced in the relevant discussion. Accordingly, for example, a "first" feature may not necessarily have any required structural or sequential relationship to a "second" feature, and so on. Further, similar features may be referred to in different portions of the discussion by different ordinal numbers. For example, a particular feature may be referred to in some discussion as a "first" feature, while a similar or substantially identical feature may be referred to in other discussion as a "third" feature, and so on.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

As noted above, in some contexts, it may be useful to support electrical boxes and other components relative to structures. Embodiments of the invention can be useful for this purpose, and others. For example, embodiments of the invention can be used to support one or more electrical boxes, mud rings, or other electrical components on a support at a configurable distance away from supporting structures, such as wall studs, or in other orientations. As another example, embodiments of the invention can include attachment devices configured to be manually engaged with corresponding rails on a support, for quick, tool-less connection of a mounting bracket to the support.

In some embodiments, an attachment device can include first and second arms configured to extend on opposite sides of a rail. In some such embodiments, the first arm can be configured as a finger that is configured to resiliently engage the rail, and the second arm can be configured as a holding plate that is configured to engage the rail opposite the finger. In some embodiments, part of an attachment device can form part of a channel configured for connecting an attachment, such as cable support, conduit support, or any other support attachment. In some embodiments, part of an attachment device can form part of a far side support, which can include foldable lateral support features that are configured to be bent to engage studs of different widths.

In some contexts, it may be useful to provide mounting brackets that can be easily formed, such as by stamping an integral body from material with a substantially uniform thickness (i.e., a thickness that does not vary beyond a range of ±5% from a nominal gauge, or otherwise remains within other conventionally acceptable manufacturing tolerances for particular applications). In some cases, however, material thickness that may be suitable for a mounting bracket as a whole may be too thin to provide sufficiently effective mounting of certain components. For example, in some configurations, use of relatively thin material to form a mounting bracket may result in relatively poor engagement of the mounting bracket by a fastener, including as may result in the stripping of self-tapped threads within mounting holes of the material, particularly during use of a power drill. Thus, for example, although the material of a conventional mounting bracket may sometimes be sufficiently strong to support the weight (and other loading) of relevant components, it may be difficult to quickly and easily secure the components to the mounting bracket.

Embodiments of the invention can address these issues, or others. For example, some embodiments of the invention can provide increased strength and durability for mounting particular components by effectively providing thicker material in the vicinity of certain mounting holes. In particular, for example, thicker material in these arrangements can provide for increased thread length for self-tapping screws and other fasteners with relatively low thread density (e.g., 16 threads per inch). In some embodiments, thicker material can be provided at mounting holes for particular components, such as mounting holes for mud rings, although a variety of other configurations are possible. In some embodiments, thicker material can be provided at particular mounting holes via formation of integral features, including extrusions or folded (e.g., doubled) bracket material at the relevant mounting holes. In some embodiments, thicker material can be provided by securing additional material to a substrate that forms a mounting face of a mounting bracket, including by welding or clasping such material to the mounting bracket in alignment with a mounting hole that is formed through the primary mounting face (e.g., on an opposing side of the bracket from the mounting face).

In some embodiments, use of locally thicker material at mounting holes may also correspond with a reduction in diameter of the mounting holes, relative to conventional sizing, as well as a general reduction in overall material thickness for a mounting bracket in general. For example, rather than 0.148 or 0.150 inch mounting hole diameters in 16 gauge (0.062 inch) steel plate, as in conventional designs, some embodiments of the invention can use 0.136 inch mounting hole diameters in 23 gauge (0.0306 inch) steel plate, with locally thicker (e.g., 0.0612 inch or more) material only at the relevant mounting holes (or in other limited-range locations).

Embodiments of the invention are presented below in the context of mounting brackets for electrical boxes, with thicker material at mounting holes that are arranged, in particular, to support mud rings. Although this configuration can be particularly useful in some contexts, including due to the particular mounting requirements for mud rings, other configurations are possible. Generally, the principles disclosed herein can be used with any variety of mounting brackets, including stud-mounted brackets, floor-supported brackets, between-stud brackets, and so on, and can be used to secure any variety of components in place.

With regard to construction, each of the embodiments presented below can be readily formed as an integral stamping, with mechanical or other (e.g., welded, adhesive-based, etc.) attachment of other components, as needed. In other embodiments, however, other manufacturing techniques can be used, including extrusion, additive manufacturing, casting, and so on.

FIGS. 1A-2B, 6 and 7 illustrate an embodiment of a mounting bracket 100 configured for mounting an electrical box 70 on a support 80 (not shown in FIGS. 2A and 2B) that includes a first (e.g., upper) rail 64 and a second (e.g., lower) rail 66. As illustrated, the mounting bracket 100 is formed as a stamping from a single blank of material (e.g., 23 gauge mild steel), although a variety of other approaches are possible.

In the illustrated embodiment, the mounting bracket 100 includes a first attachment device 104 and a second attachment device 108 connected to opposite sides of a mounting body 112. Each of the first and second attachment devices 104, 108 is configured to engage one of the first and second rails 64, 66 to secure the mounting bracket 100 to the support 80.

The mounting body 112, which is configured to be seated against a first side of the support 80, includes a variety of keyhole openings 102, other mounting holes 106, and a central opening 114. In the embodiment illustrated, the keyhole openings 102 are configured to secure electrical boxes of different configurations (e.g., the electrical box 70) or other associated components (not shown) to a mounting face 116 of the mounting bracket 100, so that the interior of the attached electrical boxes can be accessed via the central opening 114. The mounting holes 106, in contrast, are configured to secure a mud ring (e.g., a mud ring 88) to the mounting face 116. In different embodiments, a wide variety of configurations of keyhole openings or other mounting features can be used, to flexibly accommodate a wide variety of electrical boxes or other devices (e.g., mud rings).

In some embodiments, one or more of the keyhole openings 102 can be shaped differently to indicate correspondence with different box sizes. For example, entry portions of the keyhole openings can be round or hexagonal, or otherwise indicated, in order to guide installation of screws for particular sizes of electrical boxes.

In some embodiments, mounting openings on a mounting body can accommodate relatively easy attachment of other components. As shown in FIG. 2A, for example, the mounting body 112 includes a set of mounting holes 106 disposed relatively close to some of the keyhole openings 102 for attachment of electrical components, such as a mud ring 88, with fasteners 94. Usefully, the mounting holes can 106 be arranged to attach the mud ring 88 in a horizontal or vertical orientation. Although the mud ring 88 is shown as a fixed mud ring in FIG. 1A, an adjustable mud ring may also be used.

The mounting face 116 is generally formed as part of the mounting body 112 with a substantially uniform material thickness (e.g., 23 gauge). However, as illustrated in FIG. 2A in particular, an extrusion 118 extends rearward from the mounting body 112, opposite the mounting face 116, at each of the mounting holes 106. In the embodiment illustrated, the extrusions 118 extend by at least the thickness of the mounting bracket 100 at the remainder of the mounting face 116, so that each of the mounting holes 106 exhibits at least a double-thickness extension to securely engage associated threaded fasteners (e.g., self-drilling screws or self-tapping screws). In other embodiments, however, the extrusions 118 may differ from the surrounding thickness of the mounting bracket 100 by other amounts (e.g., by more or less than is illustrated). Further, in some embodiments, the thickness at two different mounting holes on the same mounting bracket (e.g., the depth of the extrusions 118 at different mounting holes 106) can exhibit different degrees of increased material thickness. For example, although the depth of each of the extrusions 118 is substantially identical in the mounting bracket 100 (i.e., identical to within conventionally acceptable manufacturing tolerances), some embodiments can exhibit extrusions of different depths or other features with different degrees of increased material thicknesses.

In the illustrated embodiment, the mounting holes 106 are disposed at opposing corners of the central opening 114, as may be particularly suitable for mounting the mud ring 88 to the mounting face 116 at a main opening of the electrical box 70. In other embodiments, however, mounting holes, including those similar to the mounting holes 106 (e.g., with increased material thickness), can be disposed at other locations or can be used to secure other components. For example, mounting holes with extrusions can be disposed at different opposing corners of a central opening of a mounting bracket. And, in other embodiments, still other configurations are possible, including configurations in which mounting holes with increased thicknesses are disposed in other locations than at opposing corners of a central opening.

Figure 3:
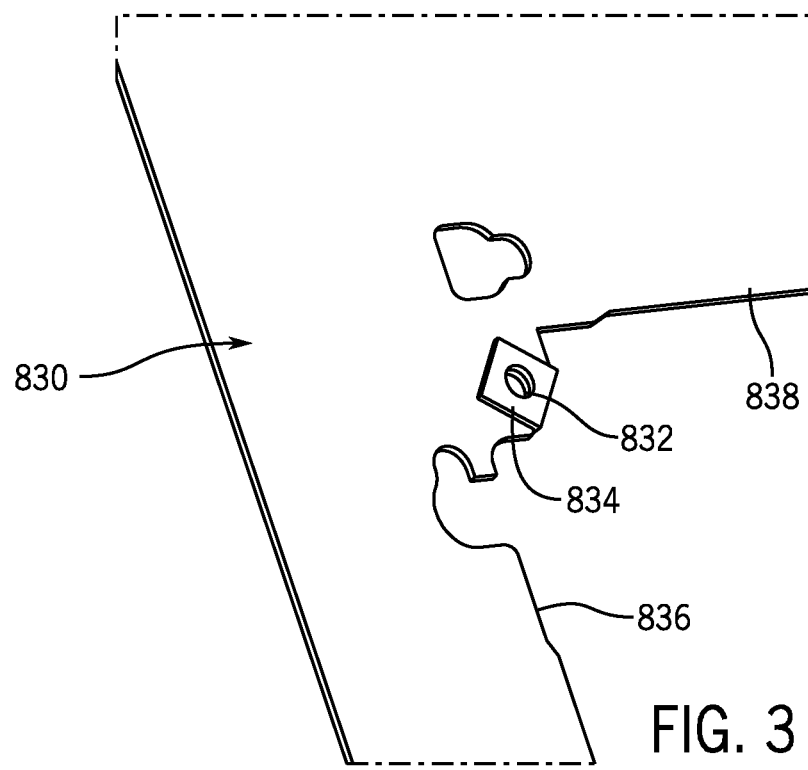
FIG. 3 is a partial rear perspective view of a mounting bracket with a mounting hole according to another embodiment of the invention.

In other embodiments, a thicker portion of a mounting bracket, relative to the surrounding material, can be formed at a particular mounting hole in a variety of other ways. As illustrated in FIG. 3, for example, a thicker portion of a mounting bracket 830 can be formed at a mounting hole 832 by folding a flap 834, with a corresponding mounting hole therethrough, into alignment with the mounting hole 832. In the embodiment illustrated, the flap 834 effectively doubles the thickness of the mounting bracket 830 at the mounting hole 832. However, other thicknesses can be provided in other embodiments (e.g., 1½ or triple thickness, etc.). Similarly, although the flap 834 is illustrated as being folded from material that would otherwise extend into the central opening 836 of the mounting bracket 830, other approaches are possible. For example, in some embodiments, flaps (not shown) can be folded from material that would otherwise form part of the mounting face 838 of the mounting bracket 830, such that additional openings are formed in the mounting face 838 by the over-folding of the flap.

Figure 4:
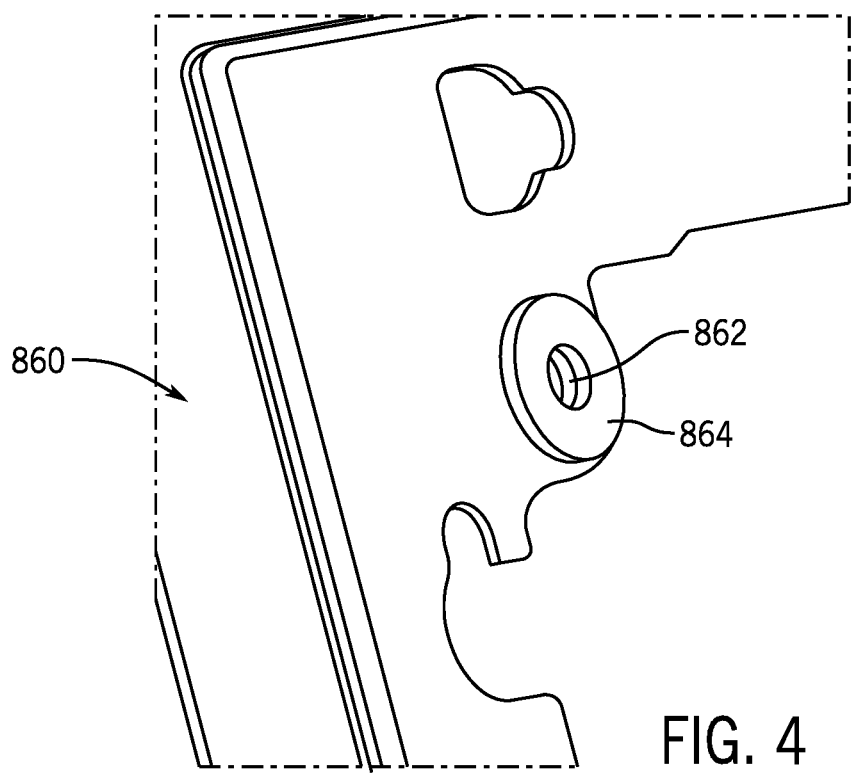
FIG. 4 is a partial rear perspective view of a mounting bracket with a mounting hole according to another embodiment of the invention.

In some embodiments, thicker material can be formed at mounting holes of mounting brackets by securing separate components to the mounting brackets in alignment with the relevant mounting holes. For example, FIG. 4 illustrates part of a mounting bracket 860 with a mounting hole 862 and a washer 864 welded into alignment with the mounting hole 862 to effectively increase the depth of the mounting hole 862 (and, correspondingly, the thickness of the material of the mounting bracket 860 around the mounting hole 862). In some embodiments, a washer or other attached component can exhibit the same thickness as the base material of a mounting bracket at the relevant mounting hole, so that an effectively doubled thickness is obtained. In other embodiments, other relative increases in material thickness are possible. Similarly, although the washer 864 is illustrated as a round washer, other geometries (and sizes) are possible.

Figure 5:
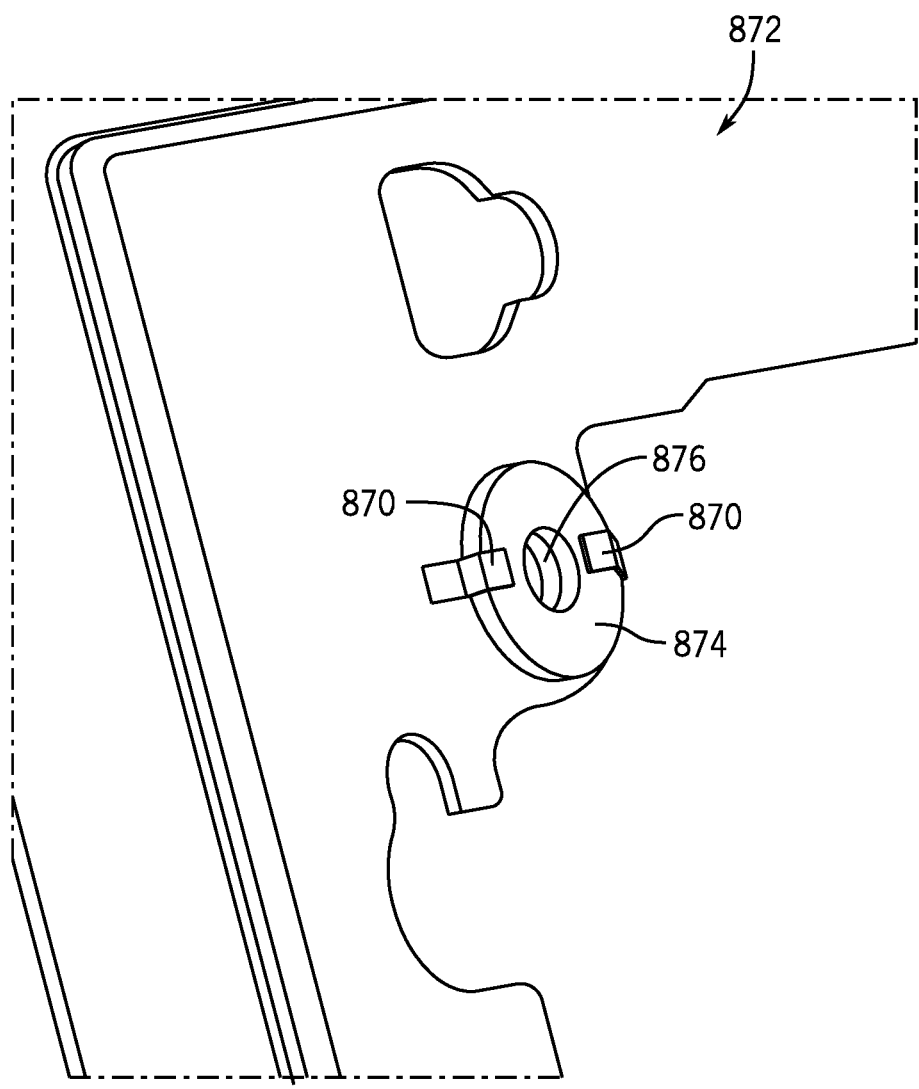
FIG. 5 is a partial rear perspective view of a mounting bracket with a mounting hole according to another embodiment of the invention

In some embodiments, attachment techniques other than welding can be used. For example, in some embodiments, adhesive can be used to secure a separate component in alignment with a mounting hole and thereby effectively increase material thickness at the mounting hole. In some embodiments, mechanical attachments can be used, such as flaps that are folded over or around another component. As one example of such a configuration, as illustrated in FIG. 5, a set of flaps 870 can be integrally formed from the body of a mounting bracket 872, to be folded over a washer 874 and thereby effectively increase the material thickness of the mounting bracket 872 at a particular mounting hole 876.

In the embodiments expressly discussed above, increased thickness of the relevant mounting brackets is obtained by providing extended material thickness that emanates from a side the mounting bracket that is opposite a mounting face thereof. For example, the extrusions 118 of the mounting bracket 100 (see FIG. 2A), the flap 834 of the mounting bracket 830 (see FIG. 3), and the washer 864 of the mounting bracket 860 (see FIG. 4) are all disposed on a rear face of the respective mounting brackets 100, 830, 860. This may be useful, for example, so that associated components (e.g., mud rings) can sit flushly against the front mounting faces of the mounting brackets 100, 830, 860. In other embodiments, however, other approaches are possible.

In some embodiments, the size and shape of material that forms an extended material thickness can be selected so as not to interfere with other components. For example, in the examples illustrated above, the extrusions 118, the flaps 834, and the washer 864 are sized to be disposed on the same side of the respective mounting brackets 100, 830, 860 as an associated electrical box 70 (shown in FIG. 1) without interfering with placement of an electrical box (e.g., so as not to overlap with side walls of the electrical box 70). In other embodiments, similar considerations can also inform design of other extensions relative to other electrical boxes or various other components.

In the examples presented in the FIGS., the various mounting holes with increased material thickness are not threaded. This may be useful, for example, in order to simplify manufacturing, with the relatively thicker material of the generally thicker material providing sufficient thickness for appropriate engagement of self-threading screws or other fasteners. In other embodiments, however, some mounting openings may be threaded before use. Similarly, although the examples of the FIGS. exhibit relevant mounting holes with diameters of 0.136 inch or smaller and overall mounting bracket material thickness of 0.0306 inch, thickened by approximately 0.033 inch at the relevant mounting holes (to make 0.064 inch overall internal thread hole thickness), other diameters and thicknesses are possible for other embodiments.

As also discussed above, some embodiments can include attachment devices that can allow a mounting bracket to be easily secured to a support, including a two-rail support, whether for permanent attachment or for staging before further attachment mechanisms (e.g., fasteners) are employed.

As illustrated in FIGS. 2A and 2B, for example, each of the first attachment device 104 and the second attachment device 108 includes: a first arm 120a, 120b; a second arm 122a, 122b opposite the first arm 120a, 120b; and a connecting wall 124a, 124b extending between the first arms 120a, 120b and the second arms 122a, 122b. Each of the connecting walls 124a, 124b, which may be integrally formed with, or otherwise attached to, the mounting body 112, extends vertically (in the illustrated orientation) between the first arm 120a, 120b and the second arm 122a, 122b. The first arms 120a, 120b are generally parallel to and laterally spaced apart from the second arms 122a, 122b. The first arms 120a, 120b and the second arms 122a, 122b also extend generally perpendicularly away from the mounting body 112 with the first arms 120a, 120b at least partially laterally overlapping the respective second arm 122a, 122b (e.g., as shown in FIG. 2B, with laterally inner ends of the first arms 120a, 120b extending laterally past laterally outer ends of the second arms 122a, 122b). This multi-arm, laterally spaced, and laterally overlapping arrangement can allow for the mounting bracket 100 to be reliably secured to a support, although differently configured arms are possible in other embodiments.

In different embodiments, arms of attachment devices can be configured in a variety of ways, including to provide secure engagement on opposing sides of a relevant rail of a support. In the illustrated embodiment, each of the first arms 120a, 120b is configured as a resiliently deformable spring arm that includes a finger 128a, 128b that is configured to extend past the corresponding first or second rail 64, 66 and engage a back side thereof, opposite the front side of the support 80. In particular, each of the fingers 128*a*, 128*b* includes a horizontal segment 130*a*, 130*b* that extends perpendicularly from the mounting body 112 to an angled engagement feature 132*a*, 132*b*. The angled engagement features 132*a*, 132*b* protrude obliquely from the segments 130*a*, 130*b* (e.g., partially vertically), in opposite relative directions, towards the corresponding second arm 122*a*, 122*b*. The illustrated angled engagement features 132*a*, 132*b* include two linear segments that are generally oriented in a V-shape, such as may allow for easy snap-on engagement with rails of a support, although other configurations are possible. Some embodiments can include angled segments that have more than two segments or only one segment. Additionally or alternatively, at least one segment of an angled engagement feature may be curved rather than linear. For example, some embodiments can include an angled engagement feature that is configured as a smooth curve.

In some embodiments, a first set of arms of an attachment device may be configured to flex to move past and thereby resiliently engage a rail of a support, whereas another set of arms of the attachment device may be configured to be relatively rigid, or at least to flex less substantially than the first set of arms. For example, opposite the fingers 128*a*, 128*b*, each of the second arms 122*a*, 122*b* of the attachment devices 104, 108 is configured as a holding plate 136*a*, 136*b* that extends generally in parallel with the horizontal segment 130*a*, 130*b* of the corresponding (opposing) finger 128*a*, 128*b*. In some embodiments, a holding plate can be substantially planar over its entire extension away from a plane of a mounting body of a mounting bracket (e.g., in contrast to a corresponding finger with angled geometry). This may provide a relatively stable configuration, for example, including (as illustrated) for configurations in which the second arms are configured to rest on vertically outer surfaces of a rail (i.e., the top of a top rail and the bottom of a bottom rail). In other embodiments, however, other configurations are possible. For example, some second arms may include fingers similar to the first arms 120*a*, 120*b*.

In some embodiments, a holding plate may form part of an attachment interface for a support feature. As shown in FIG. 2A, for example, the holding plate 136*a*, 136*b* of the second arms 122*a*, 122*b* is configured as a side wall of an attachment interface that is formed as a channel 140. The channel 140 can be U-shaped and can be configured to receive a corresponding channel of a corresponding attachment, e.g., a first means of support, in order to secure the attachment to the support 80 (see, for example, FIGS. 13 and 14). In some embodiments, a second arm can be configured as part of a different structure, and in some embodiments, a second arm may not form part of any attachment interface for a support feature or other attachment.

As noted above, it may be useful for attachment devices to include arms that are spaced laterally apart from each other, including to provide more resilient engagement with a support and to provide stability against lateral rocking or other undesirable movement. As illustrated in FIGS. 2A and 2B, for example, the first attachment device 104 and the second attachment device 108 each includes a third arm 144*a*, 144*b* and a fourth arm 146*a*, 146*b* that are spaced laterally apart from the first arm 120*a*, 120*b* and the second arm 122*a*, 122*b*, respectively. The third arm 144*a*, 144*b* and the fourth arm 146*a*, 146*b* are substantially identical to the corresponding first arm 120*a*, 120*b* and the second arm 122*a*, 122*b*, and are therefore similarly configured to engage one of the first and second rails 64, 66 of the support 80. The third arm 144*a*, 144*b* has a horizontal segment 160*a*, 160*b* and an angled engagement feature 162*a*, 162*b* and the fourth arm 146*a*, 146*b* can be configured as a side wall of an attachment interface that is formed as a channel 170*a*, 170*b*. In other embodiments, however, laterally separated arms that are configured to engage the same (or a different) side of a rail may not be substantially identical to each other. Similarly, although the second arms 122*a*, 122*b* and the fourth arms 146*a*, 146*b* on each side of the mounting bracket 100 are laterally separated from each other, some embodiments may exhibit a unitary structure for some arms. For example, some embodiments may include first and third arms spaced similarly to the first and third arms 120*a*, 120*b*, 144*a*, 144*b*, the unitary second and fourth arms disposed laterally therebetween (e.g., similar to the second arm 122*a*, 122*b* and the fourth arms 146*a*, 146*b* if joined continuously together).

Figure 6:
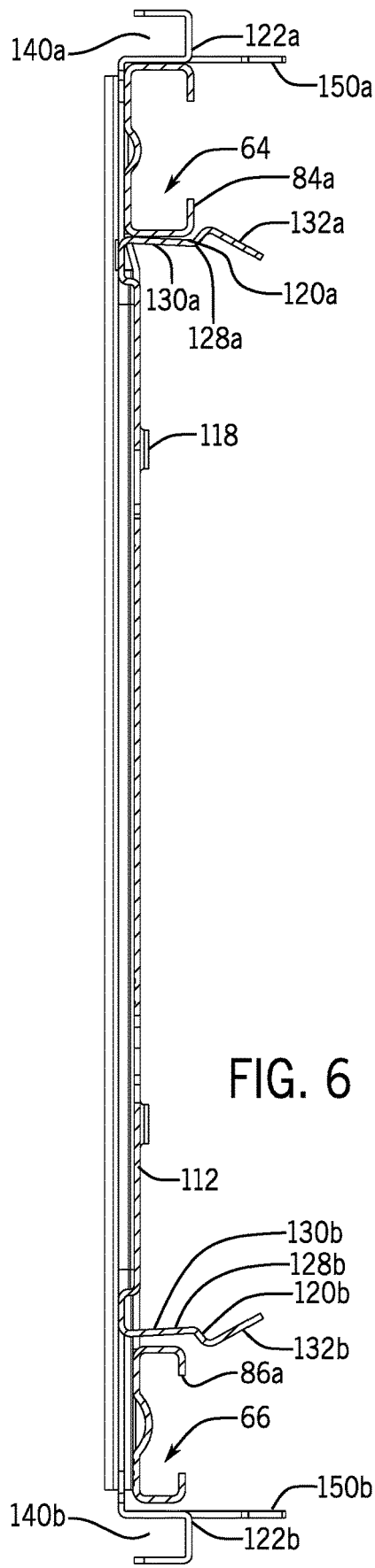
FIG. 6 is a cross-sectional view of the mounting bracket and support taken along line 6-6 of FIG. 1B, with bendable tabs in an unbent position.
Figure 7:
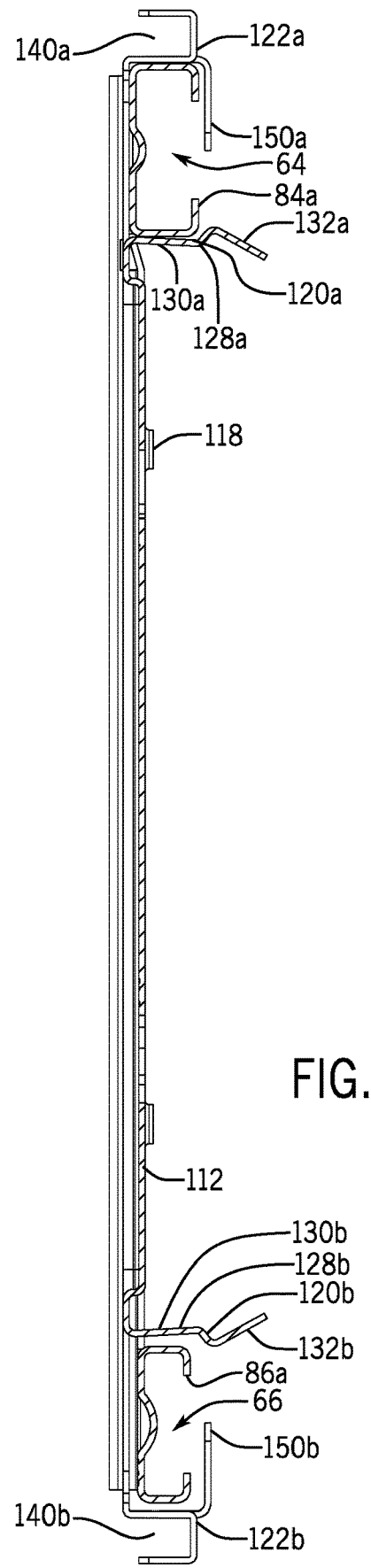
FIG. 7 is a cross-sectional view of the mounting bracket and support of FIG. 1B, from a similar perspective as FIG. 6, with the bendable tabs in a bent position.

In some embodiments, a bendable tab can be provided in order to further secure a mounting bracket to a support. For example, sets of arms may be configured to resiliently engage top and bottom sides of each of two rails of a support to stage a mounting bracket on the support, and a set of bendable tabs can then be bent to engage a back side of one or both of the two rails to help prevent the mounting bracket from being pulled off of the support. In this regard, for example, the illustrated mounting bracket 100 also includes bendable tabs 150*a*, 150*b*. In the illustrated embodiment, the tabs 150*a*, 150*b* laterally separate the second arms 122*a*, 122*b* and the fourth arms 146*a*, 146*b*, and are spaced laterally from, and positioned between, the first arms 120*a*, 120*b* and the third arms 144*a*, 144*b*, although other configurations are possible. In an unbent configuration, as shown in FIGS. 2A and 2B, the bendable tabs 150*a*, 150*b* extend perpendicularly from the mounting body 112 in substantially the same direction as the first arms 120*a*, 120*b* and the third arms 144*a*, 144*b*. As needed, the bendable tabs 150*a*, 150*b* can be selectively bent at a bending feature 152*a*, 152*b* (e.g., a slot, cut, or score line) between the unbent configuration (see FIG. 6) and a bent configuration (FIG. 7). Thus, as shown in FIG. 7, the tabs 150*a*, 150*b* can be disposed to engage a rear side of the rails 64, 66 (i.e., to the left in FIGS. 6 and 7) to further prevent the mounting bracket 100 from being pulled forward off of the rails 64, 66 (i.e., to the right in FIGS. 6 and 7).

In the illustrated embodiment, as also mentioned above, the mounting bracket 100 is integrally formed (e.g., stamped) as a single piece of mild steel. Accordingly, the attachment devices 104, 108 and other features extend continuously from the mounting body 112. In other embodiments, however, other methods of manufacturing and materials can be used and other configurations of attachment devices are accordingly possible.

In some embodiments, an attachment device can include at least one of a first arm, a second arm, a third arm, and a fourth arm that is different than at least one other first arm, second arm, third arm, or fourth arm. For example, an attachment device can include at least one second arm or fourth arm that is configured as a finger, and at least one first or third arm that is configured as a holding plate. Some mounting brackets can include more than two bendable tabs or fewer than two bendable tabs. In some embodiments, at least one bendable tab can be positioned in a location that is different than the positions of the illustrated bendable tabs. Additionally or alternatively, at least one bendable tab may be configured to be bent without a bending feature.

As previously discussed, FIGS. 1A and 1B illustrate that the first arms 120*a*, 120*b* and second arms 122*a*, 122*b* are configured to engage the rails 64, 66 of the support 80 to secure the mounting bracket 100 to the support 80. As the attachment devices 104, 108 are engaged with the rails 64, 66, at least one of the angled engagement features 132a, 132b is engaged with the corresponding first or second rail 64, 66, to flex the first arm 120a, 120b away from the second arm 122a, 122b and thereby admit the corresponding first or second rail 64, 66 between the first arm 120a, 120b and the second arm 122a, 122b. Once the corresponding rail 64, 66 is received between the first arm 120a, 120b and the second arm 122a, 122b, the first arm 120a, 120b may return to its original position to secure the mounting bracket 100 to the support. As illustrated in FIG. 6, the horizontal segments 130a, 130b of each finger 128a, 128b extend along a first side of the corresponding first or second rail 64, 66, and the holding plates 136a, 136b of the second arms 122a, 122b extend along a second side of the corresponding rail 64, 66 opposite the first arms 120a, 120b. Additionally, the angled engagement features 132a, 132b extend around and engage a back side of the corresponding first or second rail 64, 66 that is opposite the first side of the support 80 to secure the mounting bracket 100 to the support 80 without the use of separate fasteners.

In some embodiments, a support can be configured as an adjustable support that includes multiple differently sized rails segments. For example, as illustrated in FIGS. 1A and 1B, the support 80 includes a set of support members 82a, 82b that interface with each other in a nesting and telescoping relationship. Each support member 82a, 82b includes a first rail 84a, 84b, which has a larger cross-sectional profile than a second rail 86a, 86b. The second rail 86a of the support member 82a is slidably receivable within the first rail 84b of the support member 82b and the second rail member 86b of the support member 82b is slidably receivable within the first rail 84a of the support member 82a. Thus, the first and second rails 84a, 86b can be slidably nested together to form the upper (telescoping) rail 64 of the support 80 (from the perspective of FIGS. 1A and 1B) and the second and first rails 86a, 84b can be slidably nested together to form the lower (telescoping) rail 66 of the support 80 (from the perspective of FIGS. 1A and 1B).

Although the illustrated telescoping arrangement can be useful, including due to the use of similar support members to provide laterally adjustable support lengths, this can also complicate attachment of mounting brackets to the rails. For example, because of the different sizes of the first rails 84a, 84b as compared to the second rails 86a, 86b, some parts of the support 80 will exhibit upper and lower rails of different outer dimensions. Correspondingly, as shown in FIG. 1B, opposing attachment devices of a mounting bracket may need to be secured to different features (e.g., the corresponding parts of the rails 64, 66) that exhibit different dimensions.

Usefully, a symmetrical multi-arm arrangement, including as embodied in the attachment devices 104, 108, can allow a mounting bracket to be selectively secured with either of two opposing attachment devices in engagement with either of two opposing rails of a support, even when the rails exhibit different outer dimensions. For example, the mounting bracket 100 can be secured to the support 80 when the support 80 is in a configuration in which the mounting bracket 100 engages the first rail 84a and the first rail 84b (i.e., in which the rails 84a, 84b laterally overlap) at the support location, as shown in FIG. 1A. Or the mounting bracket 100 can be secured to the support 80 when the support 80 is in a configuration in which the mounting bracket engages the first rail 84a and the second rail 86a (i.e., in which the rails 84a, 84b do not laterally overlap, such that the second rail 86a is exposed) at the support location, as shown in FIG. 1B. In either case, the mounting bracket 100 can be securely attached because each of the first and second attachment devices 104, 108 is sized to extend around the larger of the relevant rails (e.g., the first rail 84a, 84b as shown in FIGS. 6 and 7), and generally secure the mounting bracket 100 thereto. Thus the mounting bracket 100 can be attached to any location on the rails 84a, 84b, 86a, 86b of the adjustable support 80, or to a different support with first and second rails that are similar (or different) in size. For example, as illustrated in FIG. 6 in particular, the relevant finger 128a can seat against a vertically inner side of the rail 84a, while the holding plate 136a can seat against a vertically outer side of the rail 84a, so that the rail 84a is relatively firmly held by the attachment device 104. In contrast, although the attachment device 108 may generally engage the second rail 86a and, in some cases, the corresponding finger 128b may resiliently snap past the second rail 86a, the corresponding finger 128b and holding plate 136b may not necessarily seat against the second rail 86a.

Continuing, the inclusion of a bendable tab can help to further secure a mounting bracket, including relative to rails of different sizes. For example, as shown in FIG. 7, the bendable tabs 150a, 150b can be bent into the bent configuration in which a portion of the bendable tabs 150a, 150b extends around the corresponding first rail 84a, 84b or second rail 86a, 86b to further secure the mounting bracket 100 to the support 80. While not necessarily required to secure the mounting bracket 100 to the support 80 for installation and use, this fastened arrangement may provide, for example, a more secure connection to allow the mounting bracket 100 and the support 80 to be assembled together and then shipped elsewhere for installation.

In some embodiments, the first attachment device 104 and the second attachment device 108 may be sized so that the mounting bracket 100 is slidably movable along the support 80, including when the first and second attachment devices 104, 108 and the bendable tab 150a, 150b engage the first rail 84a, 84b and the second rails 86a, 86b. This may be useful, for example, in order to adjust the position of the mounting bracket 100 after it is secured to the support 80.

In some embodiments, a mounting bracket can be configured to be somewhat permanently secured to a support using separate fasteners, after being initially staged using integral attachment devices. For example, as described above, the attachment devices 104, 108 and the bendable tabs 150a, 150b can be used to secure the mounting bracket 100 to the support 80, and the mounting bracket 100 then slid along the support 80 to a desired location. As desired, a user can then use screws or other separate fasteners to further secure the mounting bracket 100 for final installation (e.g., behind drywall).

As previously discussed, in some embodiments, a mounting bracket can include a second arm that includes a structure for uses other than securing the mounting bracket to a support. For example, as previously discussed, some arms can include channels that are configured to secure an attachment, such as a first means of support. As another example, as illustrated in FIG. 8-11, a mounting bracket 200 can include a first attachment device 204 similar to the first attachment device 104 and a second attachment device 208 with a second arm 222 that forms part of a far side support 258. Similarly to the second arm 122 illustrated in FIGS. 1A-2B, the far side support 258 provides a holding plate 236 that can engage a support opposite a first arm 220 that is formed as a finger that extends from the mounting body 212 in a generally horizontal direction. Accordingly, the far side support 258 can function similarly to other holding plates described herein, while also providing additional structures to help secure the mounting bracket 200 to studs or other structures and generally support the mounting bracket 200 within a wall.

In different embodiments, different configurations for a far side support are possible. For example, in an interior portion of the far side support 258, two foldable lateral supports 260 are formed by removal of material to form a gap 262 on three sides of each of the foldable lateral supports 260. This may be useful, for example, so that the foldable lateral supports 260 can be bent outward past opposite lateral sides of the far side support 258 to engage a stud (see, for example, FIGS. 10 and 11). Further, a plurality of bending features 264 are arranged along each of the foldable lateral supports 260 so that the foldable lateral supports 260 can be easily bent at multiple different locations along their respective lengths, as may correspond to different configurations of an associate stud or other structural support.

Figure 10:
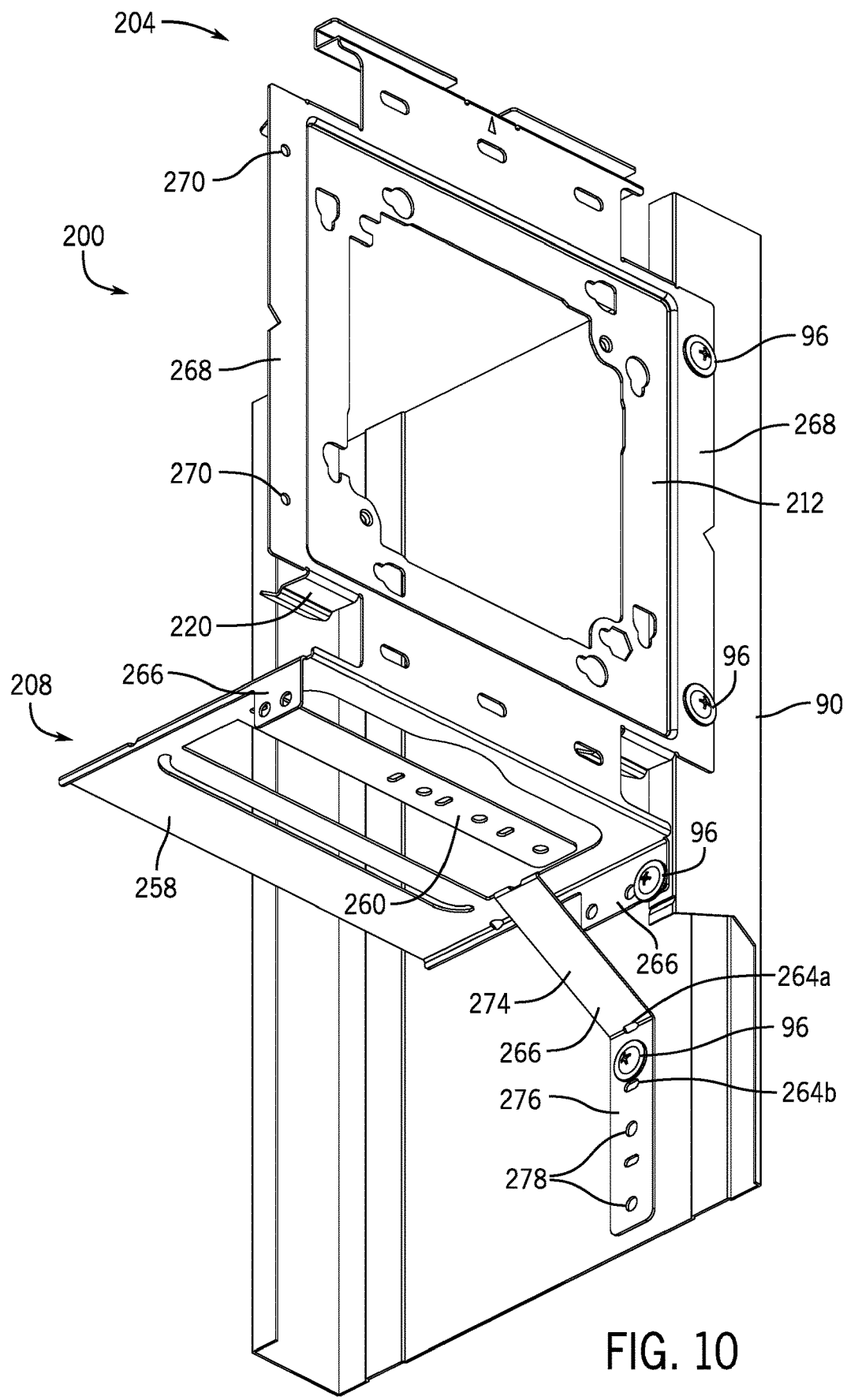
FIGS. 10 and 11 are perspective views of the mounting bracket of FIG. 9 coupled to open sides of studs, with a foldable lateral support engaging the studs.

In some embodiments, an arm of an attachment device can include other features, including tabs, to help secure a mounting bracket directly to a stud or other structure. For example, as shown in FIG. 10, the far side support 258 further includes vertical tabs 266 that project vertically downward from opposite lateral sides of a bottom side of the far side support 258. The vertical tabs 266 extend backwards from a front side proximate the mounting body 212, and the length of each of the vertical tabs 266 is selected to provide clearance for a corresponding one the foldable lateral supports 260 to be bent past the vertical tab 266. As also discussed below, the vertical tabs 266 can also help to secure the mounting bracket 200 to an adjacent stud or other support structure.

In some embodiments, a mounting bracket can include a far side support with a different number of foldable lateral supports, at least one of which may be differently configured than at least one other foldable lateral support. In some embodiments, a foldable lateral supports can be secured to and extend past a lateral side of the far side support rather than being formed on the interior of the far side support. A foldable lateral support can be formed with more or less bending features and mounting openings that the illustrated foldable lateral supports, and can be configured to be bent into only one segment or more than two segments. Additionally or alternatively, a far side support or other feature can be configured with a different number of vertical tabs, at least one of which may be differently shaped or sized.

Figure 8:
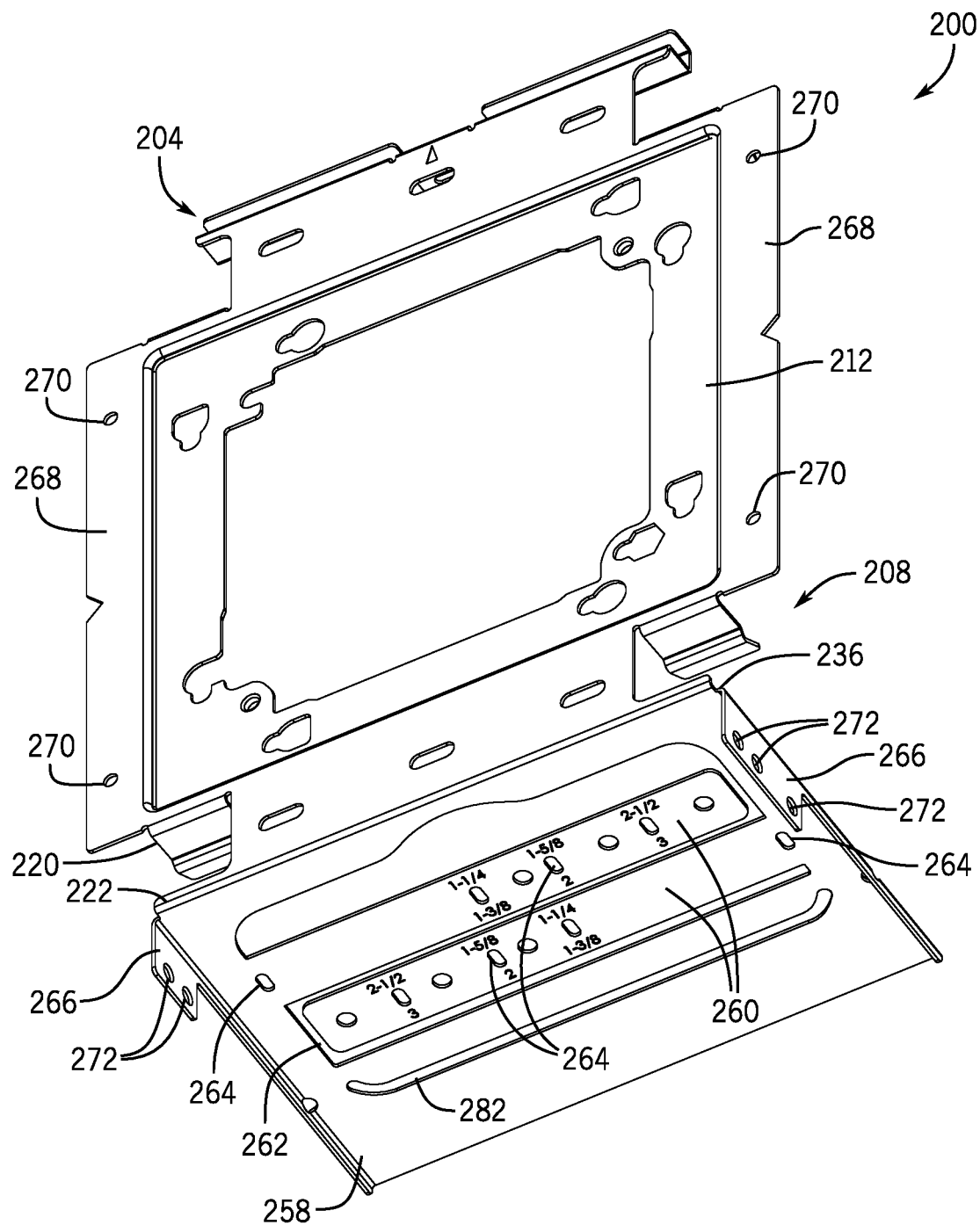
FIG. 8 is a perspective view of a mounting bracket according to another embodiment of the invention, including a far side support.

In some embodiments, a far side support can be configured to be easily adjusted to exhibit different depths and widths (i.e., extensions rearward away from a mounting body). As also illustrated in FIG. 8, for example, the mounting bracket 200 includes a channel 282 that extends laterally across a portion of the far side support 258 and is positioned between the rearmost foldable lateral support 260 and the back end of the far side support 258 opposite the mounting body 212. In some embodiments, the channel 282 can be configured as a folding feature at which the far side support can be bent at so that the mounting bracket 200 can be installed in a wall having a shallow wall depth. In a different embodiment, the channel 282 can be configured as a break feature at which the far side support 258 can be broken in order to remove the additional material. For example, it may be particularly beneficial to configure a far side support 258 with a channel 282 to provide a bending location for installation of the mounting bracket 200 with a stud 90 having a 2½ inch depth. In some embodiments, a mounting bracket can be configured without a channel, or a mounting bracket 200 that includes a channel 282 can be used without bending or breaking the far side support 258 at the channel 282. For example, the channel 282 may not be used in some installations for 3½ inch wood stud depth and 3⅝ inch steel stud depth.

Figure 9:
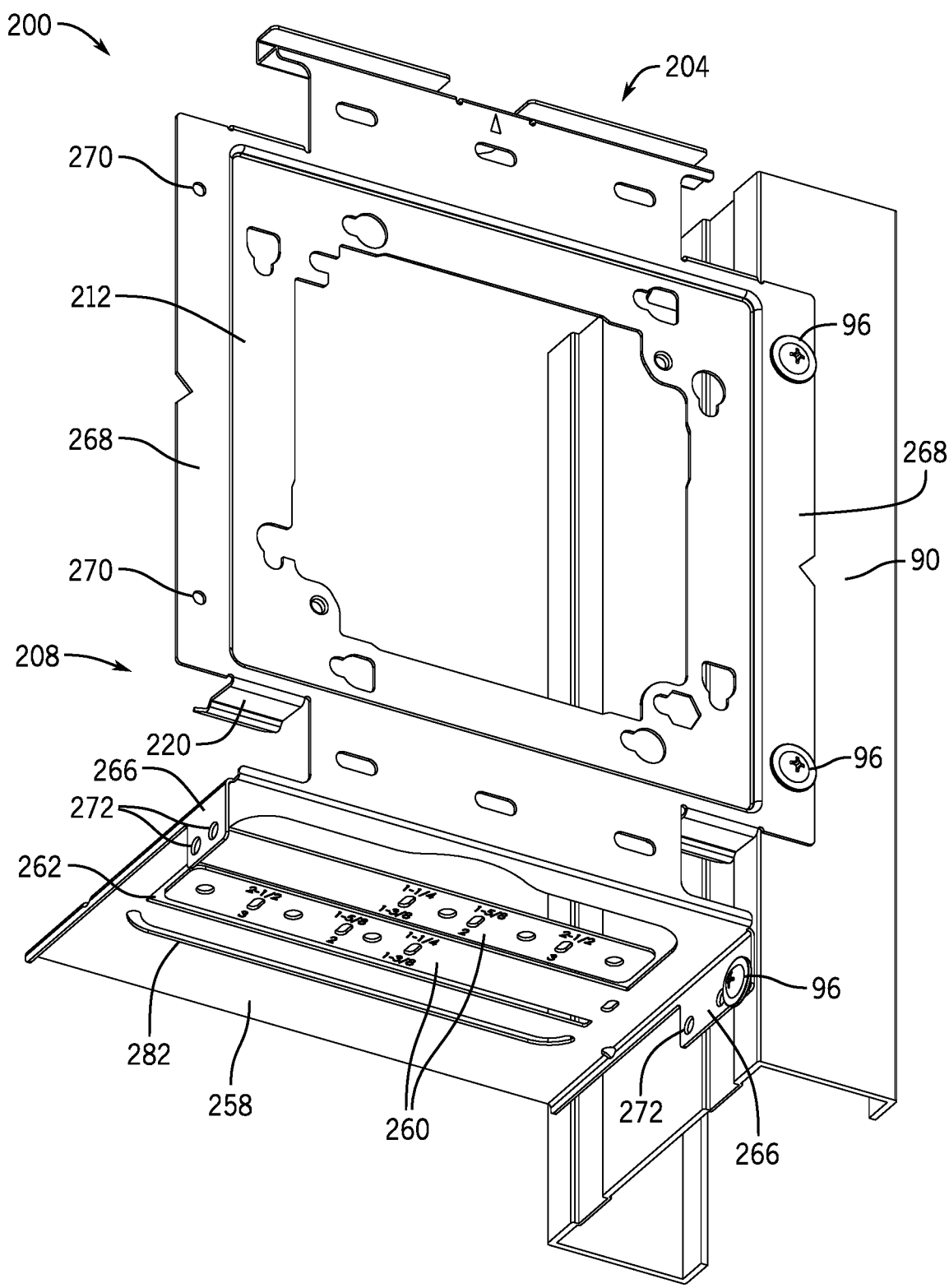
FIG. 9 is a perspective view of the mounting bracket of FIG. 8 coupled to a closed side of a stud.
Figure 11:
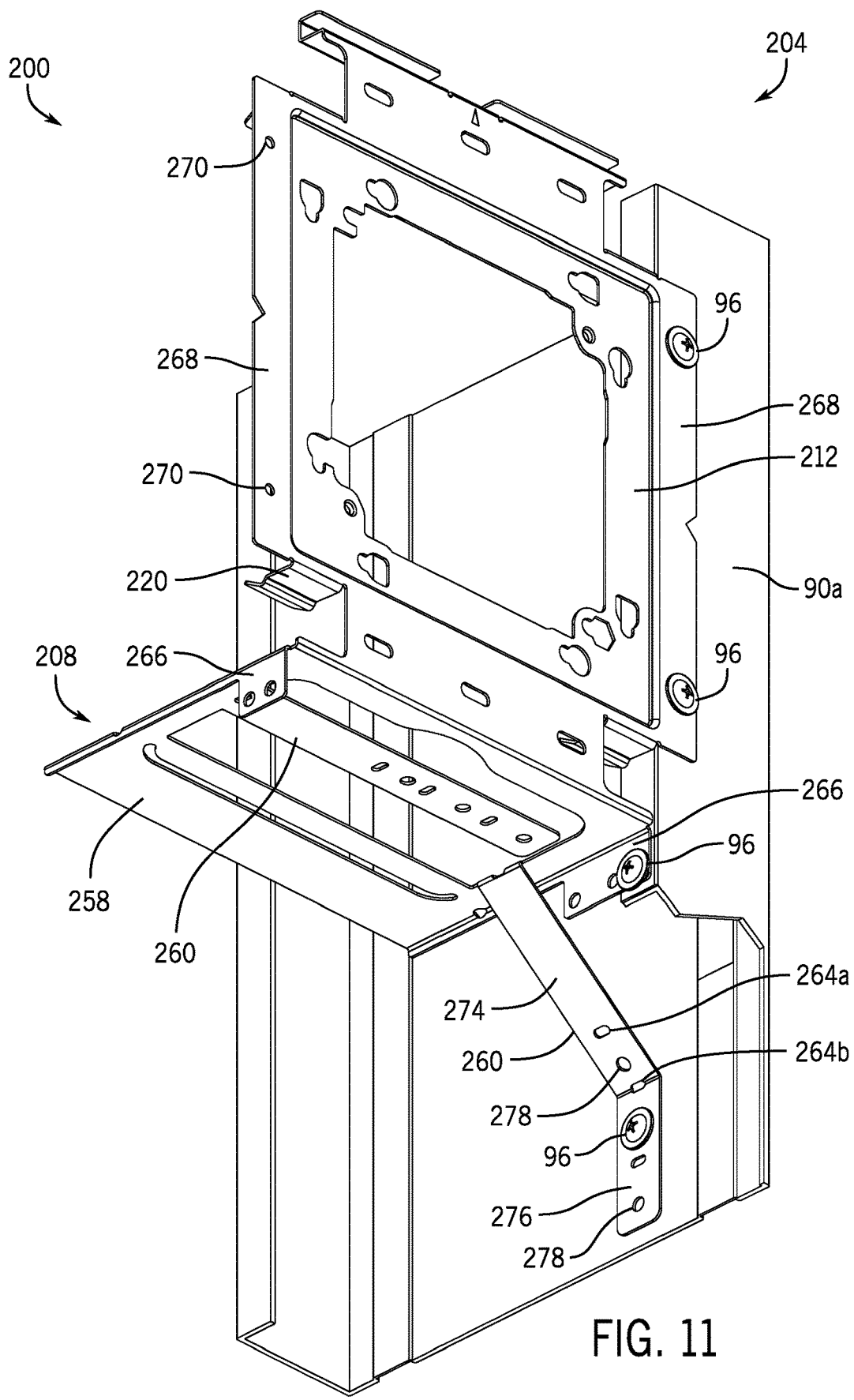

As generally noted above, some embodiments can include features for direct attachment to a stud or other building structure, as an alternative installation mode than attachment to a stud via an intervening (e.g., between-stud) support. Referring to FIGS. 9-11, for example, the foldable lateral supports 260 and the vertical tabs 266 of the far side support 258 can be useful, for example, to secure the mounting bracket 200 to a stud 90. In many installations, a mounting bracket may only be secured to a single stud. However, the mounting bracket 200 can also be secured to two studs or other structures positioned on opposite lateral sides thereof.

To facilitate attachment to a stud, the mounting bracket 200 includes ears 268 that are connected to opposite lateral sides of the mounting body 212, and are configured to extend along a front side of a respective adjacent stud 90. Mounting openings 270 formed in each of the ears 268 are configured to be engaged by a fastener 96 to secure the mounting bracket 200 to the respective stud 90. When the closed side of a stud 90, or other engageable surface, is oriented towards the mounting bracket 200 (as illustrated in FIG. 9), the corresponding vertical tab 266 extends along the side of the stud 90, and at least one mounting opening 272 formed in the vertical tab 266 can be engaged to further secure the mounting bracket 200 to the stud 90. The vertical tabs 266 may be particularly beneficial, for example, in some installations for 4 inch and 6 inch depths of the stud 90, with the closed side of the stud 90 is facing the mounting bracket 200. Vertical tabs 266 may not be used in some installations for 3½ inch and 3⅝ inch wood stud depths. In some configurations, inclusion of a recessed mounting opening (e.g., the mounting opening 272 further into the page in FIG. 9) can allow the vertical tabs 266 to be secure to a stud without a head of the relevant fastener 96 extending forward past the front surface of the stud.

In some embodiments, other configurations can be provided to secure the mounting bracket 200 to a stud or other similar support structure. For example, in some embodiments, a mounting bracket can include snap-on (e.g., u-shaped) structures, that can help to secure the bracket to a stud (e.g., for staging) without the use of separate fasteners.

As illustrated in FIGS. 10 and 11, the foldable lateral supports 260 are configured to be bent laterally outward to secure the mounting bracket 200 to a stud 90, including when an open side of the stud 90 is facing the mounting bracket 200. To engage the stud 90 in this configuration, for example, the foldable lateral supports 260 can be folded into a first segment 274 that extends from the far side support 258 to the interior surface of the stud 90 and a second segment 276 that extends along and engages the interior surface of the stud 90. In some configurations, a fastener 96 can then be readily extended through mounting openings 278 in the second segment 276 and into engagement with the stud 90.

Usefully, the length of the first and second segments 274, 276 can be adjusted for use with studs of different widths by bending the foldable lateral supports 260 to form a bend between the first and second segments 274, 276 at a bending feature that corresponds to a width of a relevant stud. Additionally, the foldable lateral supports 260 may be particularly beneficial in some installations for 1¼ inch, 1⅜ inch, 1⅝ inch, 2 inch, 2½ inch, 3 inch, and 3½ inch widths of the stud 90. However, foldable lateral supports 260 may not be used in some installations for solid wood studs.

In FIG. 10, for example, the foldable lateral supports 260 is bent at the first bending feature 264*a* so that more of the mounting openings 278 formed through the second segment 276 can be engaged to secure the mounting bracket to 200 to the stud 90. In FIG. 11, however, the illustrated mounting bracket 200 is configured to be coupled to a stud 90*a* which is wider than the stud 90 of FIG. 10. In order for the first segment 274 to extend to the interior surface of the stud 90*a*, the foldable lateral supports 260 is bent at the second bending feature 264*b* and resulting in a narrower second segment 276 with less mounting openings 278 positioned to couple the foldable lateral supports 260 to the stud 90*a*.

Figure 12A:
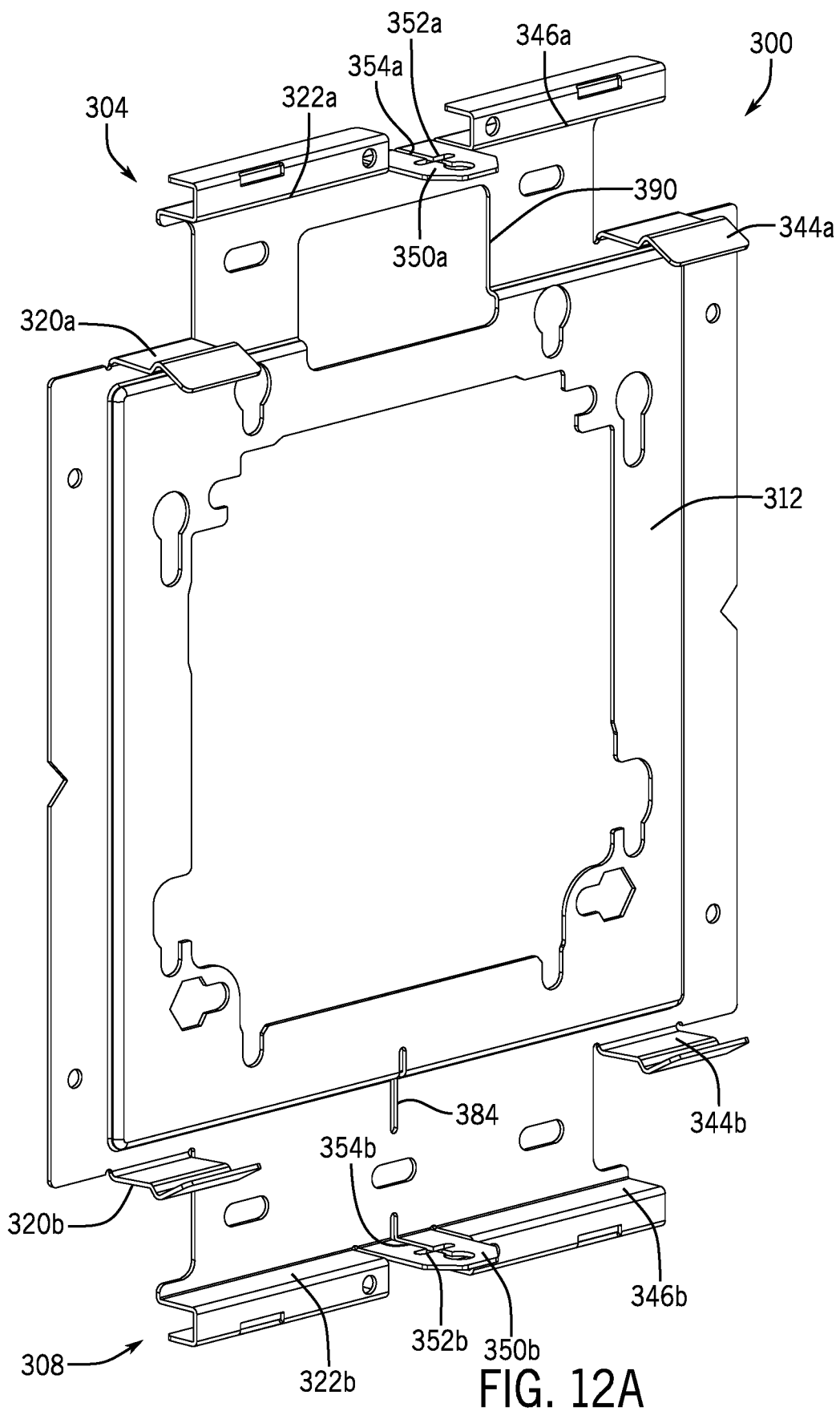
FIG. 12A is a perspective view of a mounting bracket according to another embodiment of the invention, including break features for breaking the mounting bracket into separate pieces.
Figure 12B:
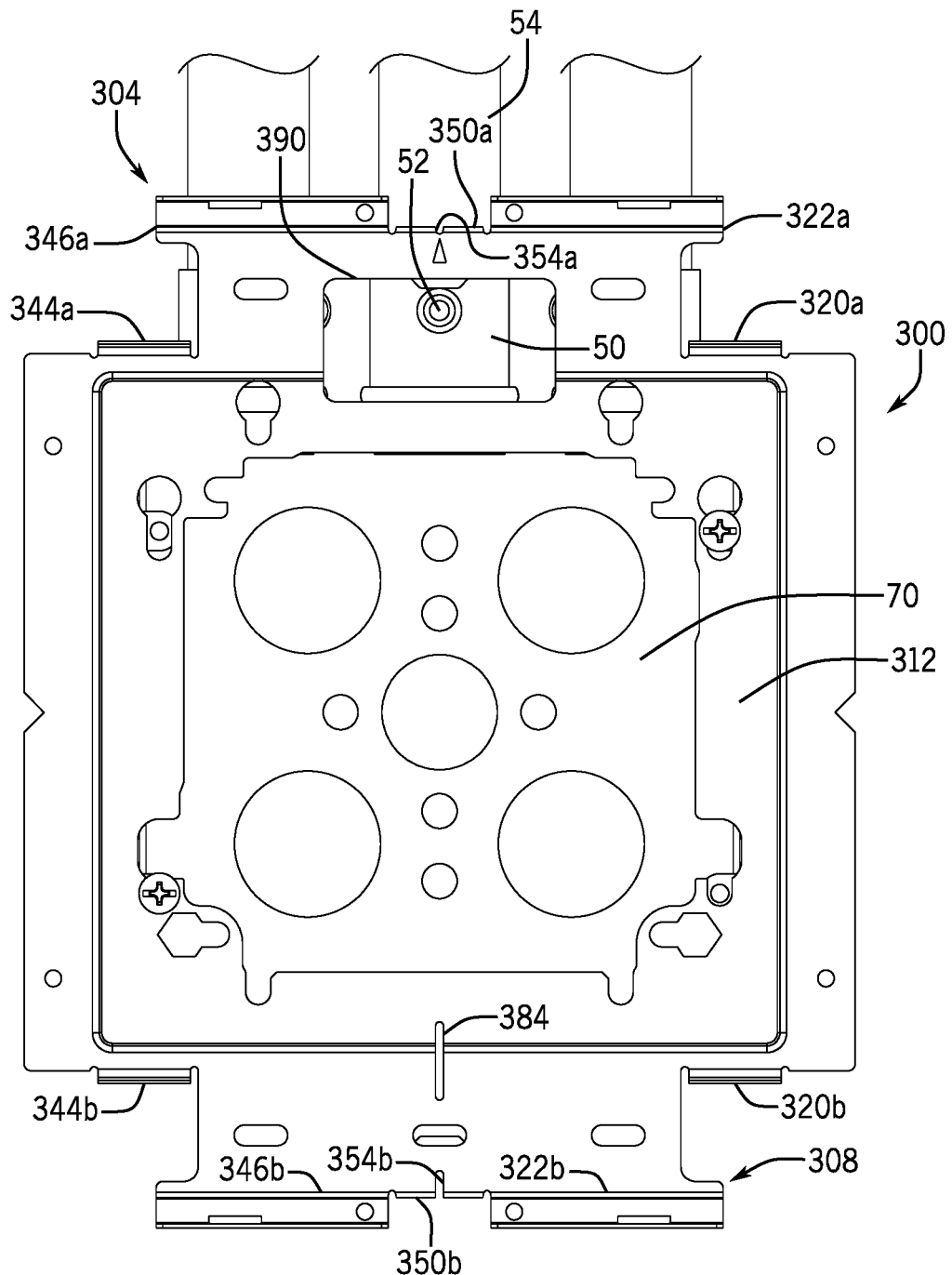
FIG. 12B is a front elevation view of the mounting bracket of FIG. 12A coupled to an electrical box with attached conduit.

FIGS. 12A-12C illustrate another mounting bracket 300 that is configured with a first attachment device 304 and second attachment device 308. Similarly to the attachment devices 104, 108 (see, e.g., FIGS. 1A and 1B), each of the first and second attachment devices 304, 308 are configured to selectively engage either of the first or second rails of a support (e.g., a telescoping support with differently sized rails) to secure the mounting bracket 300 to the support.

In this regard, also similarly to the mounting bracket illustrated in FIGS. 1A-2B, the first and second attachment devices 304, 308 each include a first arm 320*a*, 320*b* configured to extend on a first side of one of the first or second rails; and a second arm 322*a*, 322*b* that is configured to extend on a second side of the one of the first or second rails, opposite the first arm 320*a*, 320*b*. Further, the first and second attachment devices 304, 308 include a third arm 344*a*, 344*b* and a fourth arm 346*a*, 346*b* that are connected to the mounting body 312 opposite the corresponding first arms 320*a*, 320*b* and the second arms 322*a*, 322*b*, and that are similarly configured to engage the other of the first or second rails. In the illustrated embodiment, the first arms 320*a*, 320*b* and the third arms 344*a*, 344*b* are configured as fingers that are substantially the same as the finger illustrated in FIGS. 2A-2B, and the second arms 322*a*, 322*b* and the fourth arms 346*a*, 346*b* are configured as holding plates that form a side wall of a channel. In different embodiments, a first or a second attachment device can include at least one of a first arm, a second arm, a third arm, or a fourth arm that is in a different configuration.

In some embodiments, as also noted above, a mounting bracket can be configured to be easily separated into multiple pieces, such as may be useful to secure multi-gang boxes. For example, the illustrated mounting bracket 300 further includes a break feature 384 that is formed as a vertical slot that extends along the mounting body 312 and the attachment device 308. The break feature 384 is positioned between the first arm 320*b* and the third arm 344*b* of the second attachment device 308. The bendable tabs 350*a*, 350*b* may also have break features 354*a*, 354*b* extending along the bendable tabs 350*a*, 350*b* perpendicular to the bending features 352*a*, 352*b*. The break features 384, 354*a*, 354*b* are configured to be in vertical alignment with each other to provide a line along which the mounting bracket can be easily broken (e.g., manually or with hand tools) into a first piece and a second piece that are configured to be separately installed on the support.

The mounting bracket 300 also has a window 390. The window 390 extends along the mounting body 312 and the attachment device 304 and is positioned between the first arm 320*a* and the third arm 344*a*. As shown in FIG. 12B in particular, the window 390 can provide access from the front side of the mounting bracket 300 to a connector, such as a conduit connector 50, attached to an electrical box 70 behind the mounting bracket 300. The conduit connector 50 can have a set screw 52 configured to tighten the connection of a conduit 54 received within the conduit connector 50. Access to the conduit connector 50 and associated set screw 52 through the window 390 allows a user to tighten and loosen the set screw 52 after the mounting bracket 300 is attached to the electrical box 70. The window 390 can also act as a break feature similar to the break features 384, 354*a*, 354*b* and aid in breaking the mounting bracket 300 into two pieces. In some embodiments, a break feature similar to break feature 384 can be positioned between the first arm 320*a* and the third arm 344*a* of the first attachment device 304 in place of, or in addition to, the window 390. In other embodiments other combinations of windows and break features can be provided on the mounting body 312 and the first and second attachment devices 304, 308.

In the unbroken configuration (FIGS. 12A and 12B), the mounting bracket 300 is configured to secure a single-gang electrical box to the support similarly to the mounting bracket 100 as shown in FIG. 1A. In the broken configuration (FIG. 12C), the mounting bracket 300 has been broken at the break features 384, 354*a*, 354*b* into first and second pieces that are configured to be separately installed on the support 80 using separate portions of the first and second attachment devices 304, 308, respectively. This may be useful, for example, in order to secure a multi-gang electrical box 72 to the support 80, with the two pieces of the mounting bracket 300 separately engaging opposing lateral sides of the multi-gang electrical box 72. Further, because of the location of the break features 384, 354*a*, 354*b*, parts of bendable tabs included on the attachment devices 304, 308 can also be used to further secure the separated parts of the mounting bracket 300 to the support 80.

While the illustrated break features 384, 354*a*, 354*b* are configured as similar slots, some embodiments can include break features that exhibit other forms, or can include at least one break feature that is different than at least one other break feature. For example, a break feature can be configured a series of scored dots or dashes, as a continuous score line, as an array of circular or other holes, or in a variety of other configurations. Additionally or alternatively, some mounting brackets can be configured with a different number of break features than the illustrated embodiments. Further, some mounting brackets can be configured to break in more than two pieces.

Figure 13:
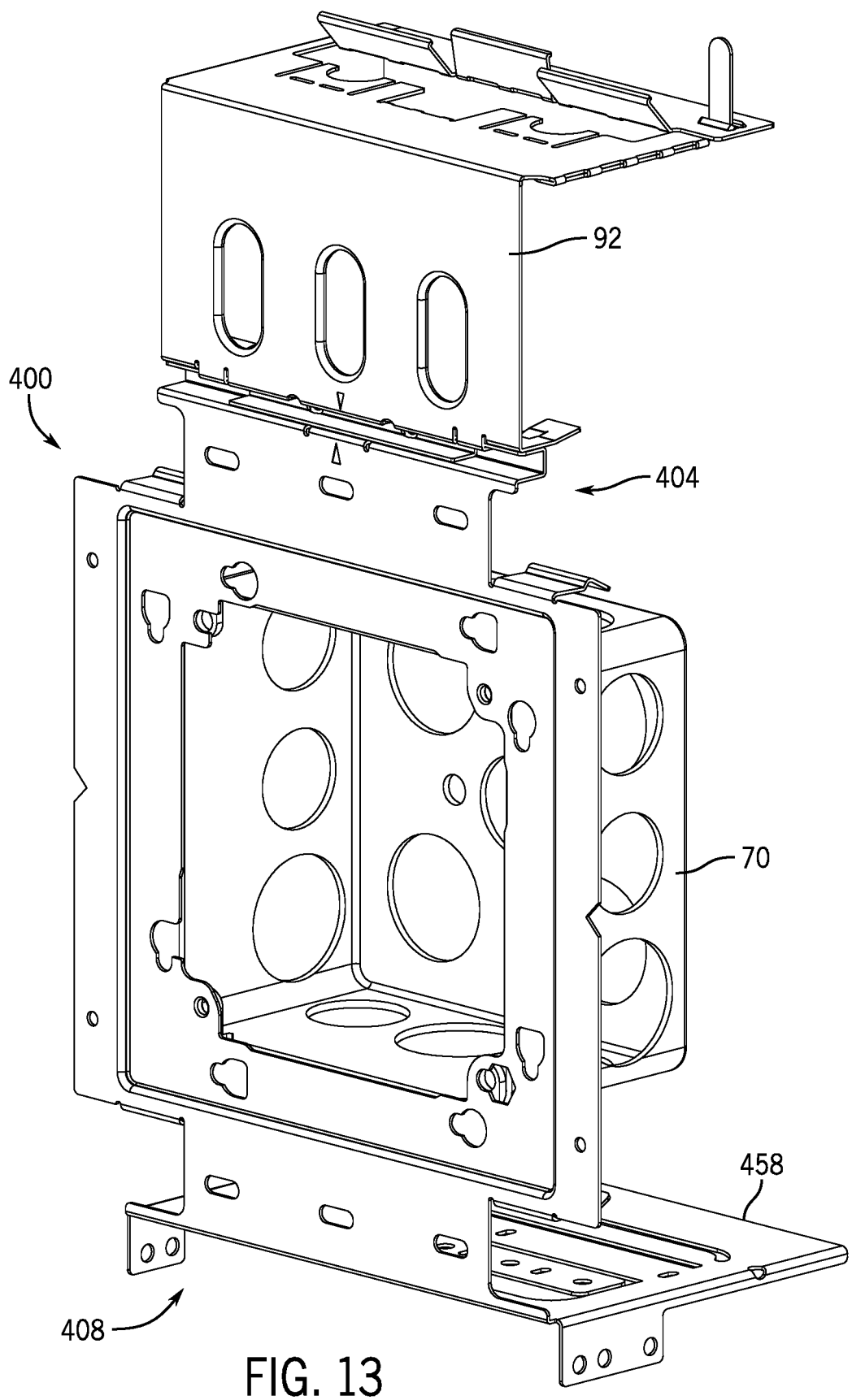
FIG. 13 is a perspective view of a mounting bracket according to another embodiment of the invention, coupled to a support attachment and an electrical box.
Figure 14:
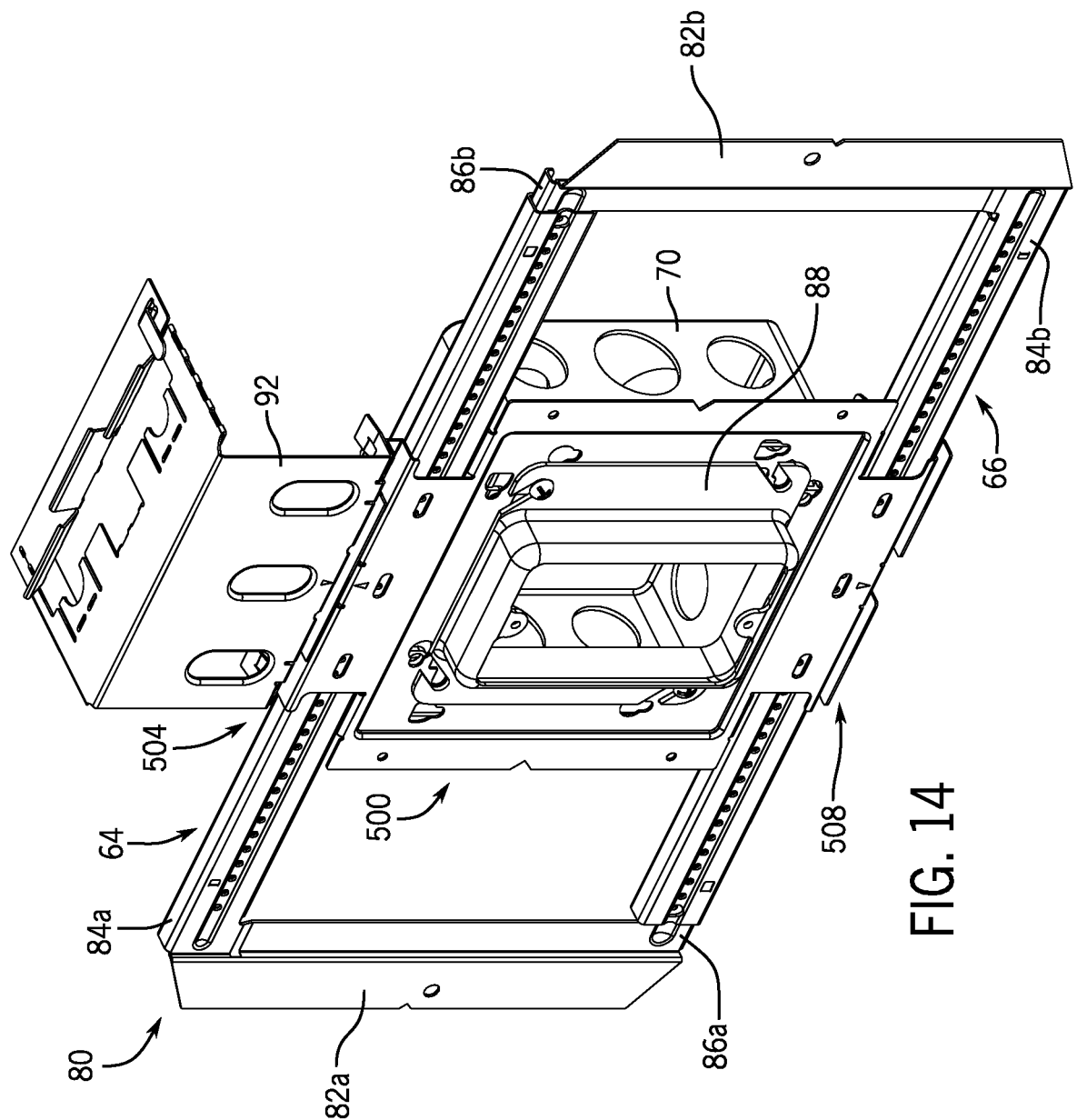
FIG. 14 is a perspective view of a mounting bracket according to another embodiment of the invention, coupled to a support attachment, a support, a mud ring, and an electrical box.
Figure 15:
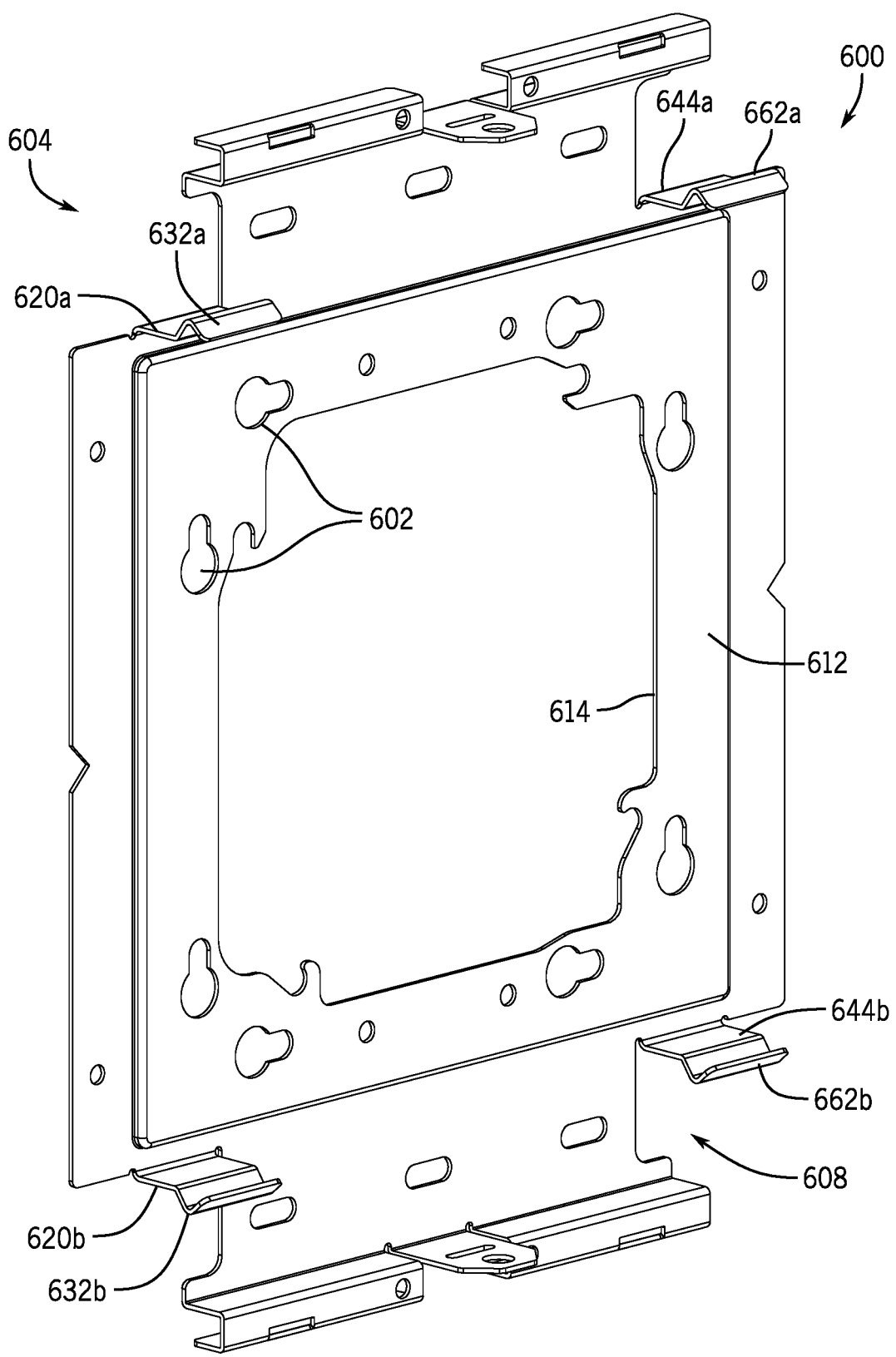
FIG. 15 is a perspective view of a mounting bracket according to another embodiment of the invention.

In other embodiments, other configurations are possible. For example, FIGS. 13-15 illustrate mounting brackets with alternative configurations, which can include different arrangements of keyholes and mounting openings. FIG. 13 illustrates a mounting bracket 400 configured to secure an electrical box 70 to a support. The mounting bracket 400 includes a first attachment device 404 with a channel secured to a support attachment 92 (e.g., a first means of support) and a second attachment device 408 that forms part of a far side support 458. FIG. 14 illustrates a mounting bracket 500 with a first attachment device 504 and a second attachment device 508 configured to mount an electrical box 70 to a support 80 with first and second support members 82*a*, 82*b*. The first attachment device 504 also has a support attachment 92. Although the mud ring 88 is shown as a fixed-depth mud ring, adjustable mud rings can also be used. FIG. 15 illustrates a mounting bracket 600 configured with a different arrangement of keyhole openings 602 and a differently shaped central opening 614 in the mounting body 612. The mounting bracket 600 also has a first attachment device 604 and a second attachment device 608 in which the first arms 620*a*, 620*b* and the third arms 644*a*, 644*b* have angled engagement features 632*a*, 632*b*, 662*a*, 662*b* with a more acutely angled V-profile than that of the angled engagement features 132*a*, 132*b*, 162*a*, 162*b* provided on the mounting bracket 100 shown in FIG. 2A. In other embodiments, still further configurations are possible.

In some implementations, devices or systems disclosed herein can be utilized or installed using methods embodying aspects of the invention. Correspondingly, description herein of particular features or capabilities of a device or system is generally intended to inherently include disclosure of a method of using such features for intended purposes and of implementing such capabilities. Similarly, express discussion of any method of using a particular device or system, unless otherwise indicated or limited, is intended to inherently include disclosure, as embodiments of the invention, of the utilized features and implemented capabilities of such device or system.

For example, with reference to FIG. 1B, some embodiments can include an installation method under which a user can install the mounting bracket 100 to the support 80. The method can include engaging the first attachment device 104 of the mounting bracket 100 with the first rail 84*a* of the support 80 and engaging the second attachment device 108 of the mounting bracket 100 with the second rail 86*a* of the support 80, as well as other activities expressly or implicitly discussed above.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. A mounting bracket for an electrical box, for use with a support having a first rail and a second rail that are spaced apart from each other to define a space to receive the electrical box, the mounting bracket comprising:
    a mounting body that includes a mounting face to secure the electrical box at a rear side of the mounting bracket, and a mounting hole formed by an extrusion that extends rearwardly from the mounting face to secure a mud ring to a front side of the mounting bracket;
    a first attachment device connected to the mounting body and a second attachment device connected to the mounting body, to resiliently secure the mounting body to the support in a first orientation and in a second orientation;
    the first attachment device being aligned to resiliently engage the first rail to secure the mounting bracket in the first orientation, and to resiliently engage the second rail to secure the mounting bracket in the second orientation; and
    the second attachment device being aligned to resiliently engage the second rail to secure the mounting bracket in the first orientation, and to resiliently engage the first rail to secure the mounting bracket in the second orientation.

2. The mounting bracket of claim 1, wherein the mounting hole is adjacent to a first corner of a central opening of the mounting body that provides access into the electrical box from a front side of the mounting bracket.

3. The mounting bracket of claim 2, further comprising:
    a second mounting hole formed by a second extrusion that extends rearwardly from the mounting face to secure the mud ring, the second mounting hole being located adjacent to a second corner of the central opening that is opposite the first corner.

4. The mounting bracket of claim 1, wherein the first attachment device includes a bendable tab that extends rearwardly from the mounting face to be bendable into engagement with a rear side of the first rail or the second rail, with the mounting bracket in the first orientation or the second orientation, respectively.

5. The mounting bracket of claim 4, wherein the mounting body includes one or more break features that extend onto the bendable tab to define a first mounting bracket piece and a second mounting bracket piece, separable from each other along the one or more break features.

6. The mounting bracket of claim 1, the first attachment device further including, extending rearwardly relative to the mounting body:
    a first arm that extends to engage with a first side of the first or second rail; and
    a second arm that extends to engage with a second side of the first or second rail that is opposite the first side, and includes an attachment interface to secure an attachment to the mounting bracket.

7. A method for electrical assemblies that include an electrical box, the method comprising:
    securing a mounting bracket to a between-stud support that includes a first rail and a second rail that are spaced apart from each other, with the mounting bracket in, selectively, either of a first orientation or a second orientation;
    in the first orientation, a first attachment device of the mounting bracket engaging the first rail and a second attachment device of the mounting bracket engaging the second rail to resiliently secure the mounting bracket to the between-stud support, to support: an electrical box extending rearwardly from a mounting face of the mounting bracket, and a mud ring extending forwardly from the mounting face and secured to the mounting bracket at a mounting hole defined by an extrusion that extends rearwardly from the mounting face; and
    in the second orientation, the first attachment device engaging the second rail and the second attachment device engaging the first rail to resiliently secure the mounting bracket to the between-stud support, to support: the electrical box extending rearwardly from the mounting face and the mud ring extending forwardly from the mounting face and secured to the mounting bracket at the mounting hole.

8. The method of claim 7, wherein the mounting hole is adjacent to a corner of a central opening of the mounting face; and
    wherein securing the electrical box to the mounting bracket includes securing the electrical box at a keyhole opening that is also adjacent to the corner of the central opening.

9. The method of claim 7, wherein, in the first and second orientations, the mud ring is further secured to the mounting bracket at a second mounting hole that is on an opposite side of a central opening of the mounting bracket from the mounting hole, the second mounting hole being defined by a second extrusion that extends rearwardly from the mounting face.

10. The method of claim 7, further comprising:
bending a bendable tab of the first attachment device to engage with a rear side of the first rail or the second rail to further secure the mounting bracket to the between-stud support.

11. The method of claim 7, further comprising:
before securing the electrical box to the mounting bracket, breaking the mounting bracket at a break feature to form a first mounting bracket piece and a second mounting bracket piece, the break feature including one or more of:
first one or more slots that extend along a mounting body of the mounting bracket and along the first and second attachment devices; or
second one or more slots that extend along a bendable tab of one or both of the first attachment device or the second attachment device.

12. The method of claim 7, wherein securing the mounting bracket in the first orientation includes securing the mounting bracket with a first arm, a second arm, and a third arm of the first attachment device that collectively engage first and second sides of the first rail.

13. An electrical box assembly comprising:
a between-stud support that includes a first rail and a second rail that are spaced apart from each other to define a space to receive an electrical box; and
a mounting bracket secured to the between-stud support in either of a first orientation or a second orientation, the mounting bracket including:
  a mounting body including a mounting face that secures an electrical box to the mounting bracket, the mounting face including:
    a central opening that provides access to an inside of the electrical box;
    a keyhole opening that secures the electrical box on a back side of the mounting face, the keyhole opening being defined by material of the mounting face that has a first thickness; and
    a mounting hole defined by material of the mounting face that has a second thickness greater than the first thickness; and
  a first attachment device that extends from the mounting body to secure the mounting bracket to the between-stud support, the first attachment device including, extending rearwardly relative to the mounting body:
    a first arm that engages with a first side of the first rail in the first orientation and a first side of the second rail in the second orientation; and
    a second arm that engages with a second side of the first rail in the first orientation and a second side of the second rail in the second orientation; and
  a mud ring secured to the mounting hole on a front side of the mounting face.

14. The electrical box assembly of claim 13, wherein the second thickness is at least twice the first thickness.

15. The electrical box assembly of claim 13, wherein the second thickness is defined by an extrusion that extends rearwardly away from the mounting face.

16. The electrical box assembly of claim 13, wherein the second thickness is defined by one or more of:
a folded flap of the mounting face; or
a washer attached to the mounting face.

17. The electrical box assembly of claim 13, wherein the mud ring is a fixed-depth mud ring or an adjustable mud ring.

18. The electrical box assembly of claim 13, wherein the second arm includes a holding plate and an opposing sidewall, the opposing sidewall being spaced apart from the holding plate to define a U-shaped channel.

19. The electrical box assembly of claim 13, wherein the first attachment device further includes a third arm that engages with the first side of the first rail in the first orientation and the first side of the second rail in the second orientation; and
wherein one or both of the first arm or the third arm laterally overlap with the second arm.

20. The electrical box assembly of claim 13, wherein the mounting bracket further includes a tab that extends from the mounting body and is bent to engage with a rear side of the first rail in the first orientation and with a rear side of the second rail in the second orientation.

* * * * *